United States Patent
Sakai et al.

[19]

[11] Patent Number: 6,005,869
[45] Date of Patent: Dec. 21, 1999

[54] COMMUNICATION NETWORK

[75] Inventors: Takahisa Sakai, Amagasaki; Toshihisa Ikeda, Kyoto; Toshihiko Kurosaki, Kobe; Yuji Mizuguchi, Kyoto; Toshio Oga, Neyagawa, all of Japan

[73] Assignee: Matsushita Electric Industrial Co., Ltd., Osaka-fu, Japan

[21] Appl. No.: 08/843,597

[22] Filed: Apr. 16, 1997

[30] Foreign Application Priority Data

| Apr. 17, 1996 | [JP] | Japan | 8-095218 |
| Apr. 23, 1996 | [JP] | Japan | 8-100923 |
| Apr. 23, 1996 | [JP] | Japan | 8-100924 |
| Aug. 20, 1996 | [JP] | Japan | 8-218172 |
| Nov. 6, 1996 | [JP] | Japan | 8-293517 |
| Nov. 6, 1996 | [JP] | Japan | 8-293518 |

[51] Int. Cl.[6] .................................................. H04L 12/423
[52] U.S. Cl. .......................................... 370/452; 370/503
[58] Field of Search .................................... 370/450, 452, 370/453, 454, 455, 460, 443, 419, 420, 509, 514, 503

[56] References Cited

U.S. PATENT DOCUMENTS

| 4,373,183 | 2/1983 | Means et al. | 370/462 |
| 4,713,807 | 12/1987 | Caves et al. | 370/452 |
| 4,982,185 | 1/1991 | Holmberg et al. | 370/452 |
| 5,051,985 | 9/1991 | Cidon et al. | 370/452 |
| 5,052,029 | 9/1991 | James et al. . | |
| 5,249,269 | 9/1993 | Nakao et al. | 395/200.55 |
| 5,388,097 | 2/1995 | Baugher et al. . | |
| 5,392,281 | 2/1995 | Baumert et al. | 370/235 |
| 5,490,145 | 2/1996 | Tanabe et al. | 370/452 |
| 5,544,324 | 8/1996 | Edem et al. . | |

Primary Examiner—Hassan Kizou
Assistant Examiner—Daniel Previl
Attorney, Agent, or Firm—Wenderoth, Lind & Ponack, L.L.P.

[57] ABSTRACT

A master station including at least a token packet (Iso) management table in which the overall band of the bus is partitioned into certain bands, rewrites the token packet (Iso) management table according to the bandwidth required in Isochronous data transmission between stations to at least control transmission of token packets (Iso) and dynamically control the bandwidth.

33 Claims, 28 Drawing Sheets

FIG. 17

| TOKEN (Iso)No. | ACTUAL ID INFORMATION OF SOURCE STATION | ACTUAL ID INFORMATION OF DESTINATION STATION |
|---|---|---|
| 1 | #2 | #3 |
| 2 | NULL | NULL |
| 3 | #2 | #3 |
| ... | ... | ... |
| n-1 | #2 | #3 |
| n | NULL | NULL |

1503

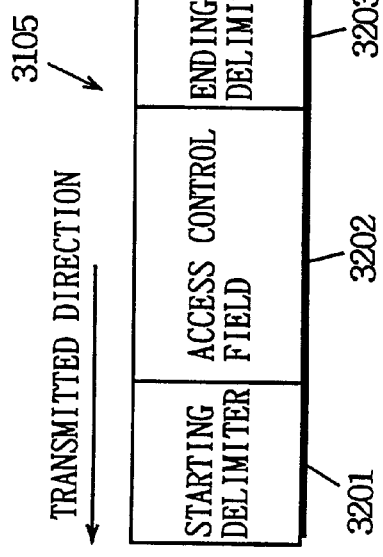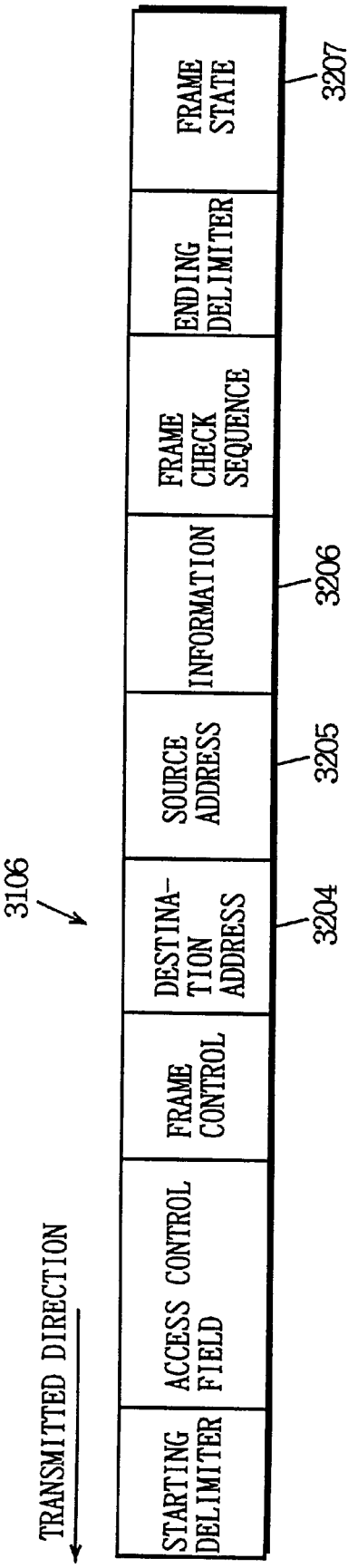
F I G. 3 2(a) PRIOR ART
F I G. 3 2(b) PRIOR ART

COMMUNICATION NETWORK

BACKGROUND OF THE INVENTION

1. Field of the Invention

The present invention relates to communication networks, and more particularly to a communication network including a single master station and a plurality of slave stations.

2. Description of the Background Art

In these years, Local Area Networks (hereinafter referred to as LANs) are in use, which are data communication systems in which a large number of independent devices can directly communicate with one another within an adequate distance through a physical link having a prescribed data rate. Media access controls in the LANs include the token passing. FIG. 31 is a diagram illustrating the structure of a token ring LAN adopting the token passing and the data communication in that LAN. In FIG. 31, stations 3101, 3102 and 3103 are connected to a ring-shaped bus 3104 to communicate with one another. These stations 3101–3103 are previously provided with ID information in an un-overlapping manner for specifying each station. The data communication in this LAN will now be described referring to FIG. 31.

In the LAN, as shown in FIG. 31(a), a token 3105 circulates along the bus 3104. The format of this token 3105 includes, as shown in FIG. 32(a), a starting delimiter 3201, an access control field 3202 and an ending delimiter 3203.

Each station once acquires the token 3105 coming from the bus 3104. When having no data to transmit at this time, however, it sends out the token 3105 onto the bus 3104 toward a station located on the downstream. This operation is continuously repeated, so that the token 3105 is constantly circulating on the bus 3104 in a certain direction when no station has data to transmit As shown in FIG. 31(b), the station 3102 currently holds transmission data 3106. As shown in FIG. 32(b), the frame format of the transmission data 3106 includes destination address 3204, source address 3205, information 3206, frame status 3207 and other necessary control information (starting delimiter, access control field, frame control, frame check sequence and ending delimiter). The station 3102 acquires and holds the coming token 3105 and then, as shown in FIG. 31(c), sends out the transmission data 3106 onto the bus 3104. It is assumed that this transmission data 3106 contains ID information for the station 3101 as the destination address 3204.

The station 3103 located downstream of the station 3102 acquires the coming transmission data 3106. The station 3103 then determines whether the ID information of the destination address 3204 included in the transmission data 3106 agree with the ID information assigned to itself. In the station 3103, the two pieces of ID information disagree. In this case, the station 3103 sends out the transmission data 3106 onto the bus 3104.

Next, as shown in FIG. 31(d), the station 3101 acquires the transmission data 3106 and operates similarly to the station 3103. In the station 3101, the ID information stored in the destination address 3204 agrees with the ID information assigned to it. In this case, the station 3101 copies the information 3206 included in the transmission data 3106 and indicates reception of the information by using a frame copy bit included in the frame status 3207. Then the station 3101 sends out the transmission data 3106 onto the bus 3104.

The transmission data 3106 circulates around the bus 3104 and returns to the station 3102, as shown in FIG. 31(e).

The station 3102, knowing that it has sent out the transmission data 3106, detects the head of the frame to know that the transmission data 3106 sent by itself has returned. The station 3102 then checks the frame copy bit included in the frame status 3207 to know that the station 3101 has received the data. Thus, knowing that the data communication to the station 3101 has been normally achieved, the station 3102 sends out the currently held token 3105 onto the bus 3104, as shown in FIG. 31(f). A series of operation for data communication are thus ended.

Recently, with the digitization of picture data and sound data, not only are computers connected to the LAN but various AV (Audio Video) equipment handling picture data and sound data are also connected to the LAN. This has brought about mixed existence of two kinds of data with different natures in the LAN: Asynchronous data and Isochronous data. That is to say, the AV equipment perform communication of computer data such as AV equipment control commands, or the Asynchronous data for controlling the data communication, and they further perform communication of digital AV data image-compressed by MPEG (Moving Picture Experts Group) and the like, or the Isochronous data. The digital AV data (Isochronous data), having a highly real-time nature, that is, having continuity in time, requires that the communication should be done certainly within a certain time period.

In conventional LANs, however, the token is sent around even to stations having no transmission data and a station which has acquired the token keeps it until it confirms that the data transmitted by itself has been received by a destination station. If a certain station keeps the token arrested with a plurality of stations transferring Isochronous data, other stations can not transfer the Isochronous data. Then the real-time nature of Isochronous data held in other stations are not satisfied, causing problems in the data communication.

Although not the above-mentioned token ring LAN, a single master station for controlling transmission of tokens and a plurality of slave stations only for data communication are connected to a Master Slave Network, where each station analyzes a coming token and then sends out the token onto the bus. FIG. 33 is a diagram illustrating the analysis of the token 336 in each station.

In FIG. 33, in the Master Slave Network, a master station 331a and slave stations 331b, 331c and 331d are connected to the ring-shaped bus 335 so that they can communicate with each other. The master station 331a includes a token transfer and analysis executing device 332a and a storage device 333a. The slave stations 331b–331d include analysis executing devices 332b–332d and storage devices 333b–333d.

The token transfer and analysis executing device 332a sends out the token 336 onto the bus 335 through the storage device 333a. The token 336 is once stored in the storage device 333b of the slave station 331b and then analyzed by the analysis executing device 332b. When this analysis is finished, the token 336 is transferred from the slave station 331b to the bus 335 again and inputted to the slave station 331c. The analysis executing device 332c too applies such analyzing process as performed in the analysis executing device 332b to the token 336 stored in the internal storage device 333c. Such analyzing process is similarly performed in the slave station 331c as well and the token 336 is finally stored in the storage device 333a in the master station 331a. The token transfer and analysis executing device 332a applies the analyzing process described above to the token 336 stored in the storage device 333a and then sends out the analyzed token 336 onto the bus 335.

In the conventional Master Slave Network, the analysis executing devices 332b–332d and the token transfer and analysis executing device 332a apply analyzing process to the token 336 stored in the storage devices 333b–333d and 333a. That is to say, it takes the time required for transfer on the bus 335 plus the time required for analyzing processes in the slave stations 331b–331d. Accordingly, it takes a long time before the token 336 comes back to the master station 331 a. Similarly, data sent out by a slave station which has acquired the token 336 also takes a long time to circulate around the bus 335. Since this problem becomes more serious as a larger number of stations are connected, high utilization efficiency and high response can not be expected with a large number of stations connected in the Master Slave Network. To solve the problem, it is suggested to improve the utilization efficiency and response speed by causing the storage devices and analysis executing devices to operate at higher speeds or by reducing the number of stations connected to the network. However, remarkable effects are not expected.

SUMMARY OF THE INVENTION

Accordingly, a first object of the present invention is to provide a communication network which enables each station to transmit Isochronous data requiring highly real-time performance.

A second object of the present invention is to provide a communication network which can realize high utilization efficiency and high response without requiring high-speed or large-scale storage devices and analysis executing devices.

To achieve the objects above, the following first to fortieth aspects of the present invention comprise the following structures and features.

According to a first aspect, in a communication network comprising a single master station and a plurality of slave stations connected to a ring-shaped bus:
  each of the slave stations comprises ID information set to identify each slave station; and
  each of the slave stations comprises a register portion for storing the ID information and a switch portion for opening/closing the loop of the ring-shaped bus,
  wherein the master station sends out commands to the plurality of slave stations in order, station by station, and
  in response to each of the commands, each of the slave stations receiving the command stores the ID information set for itself into the register portion and closes its own switch portion.

In accordance with the first aspect, each slave station closes its switch portion when receiving a command. This allows the master station to give the commands in order starting from the slave station located right downstream on the ring-shaped bus.

According to a second aspect, in the first aspect, when any of the ID information stored in the register portions of the plurality of slave stations overlap,
  the master station causes the overlapping ID information to rewrite into another un-overlapping ID information in regard to the slave station storing the overlapping ID information in the register portion.

In accordance with the second aspect, if any pieces of ID information previously set for the individual slave stations overlap, other pieces of un-overlapping ID information are provided to the corresponding slave stations, which prevents collision of data on the bus.

According to a third aspect, in the first aspect, when the commands have been sequentially transferred to the slave stations, from the slave station closest to the master station to the slave station at the end, the switch portions of all the slave stations are closed so that the ring-shaped bus forms the loop, and
  as the command sent out with the bus forming the loop has traveled around the loop and returned to the master station, the master station recognizes the number of the slave stations connected to the bus.

In accordance with the third aspect, the command that is sent out after all of the slave stations connected to the bus have been provided with the commands travels around the bus and returns to the master station. This allows the master station to grasp the number of the slave stations connected on the bus.

According to a fourth aspect, in the first aspect, the master station repeatedly sends out the commands for the number of times corresponding to the number of the slave stations connected to the ring-shaped bus, whereby the switch portions of all of the slave stations are closed.

In accordance with the fourth aspect, the loop is formed in the bus as the switch portions of all of the slave stations are closed. This enables data communication starting from the master station.

According to a fifth aspect, in a communication network comprising a single master station and a plurality of slave stations connected to a ring-shaped bus,
  the maser station comprises,
    a token transfer/analysis executing portion for sending out a token, analyzing the token and controlling transmission of data, and
    a switch portion for disconnecting the loop of the ring-shaped bus and switching the connection to the token transfer/analysis executing portion, and
  each of the slave stations comprises,
    an analysis executing portion for analyzing the token and controlling transmission of data, and
    a switch portion for disconnecting the loop of the ring-shaped bus and switching the connection to the analysis executing portion,
    wherein the master station and the slave stations transmit and delete the token or the data by switching their respective switch portions.

In accordance with the fifth aspect, switching the master station switch portion or the slave station switch portions allows a token or data to merely pass therethrough. This provides a communication network which can realize high utilization efficiency and high-speed response.

According to a sixth aspect, in the fifth aspect, the master station sends out the token onto the ring-shaped bus from the token transfer/analysis executing portion, and
  when the token has traveled around the ring-shaped bus and returned to itself, the master station deletes the token in the token transfer/analysis executing portion, and
  switches the master station switch portion to connect the loop of the ring-shaped bus.

In accordance with the sixth aspect, when a token sent out by the master station returns, the master station switches the master station switch portion to connect the loop of the ring-shaped bus. This forms the loop of the ring-shaped bus to enable data communication.

According to a seventh aspect, in the fifth aspect, the master station authorizes a particular station to transmit data by using the token, and when authorized to transmit data by the token, the station sends out the data from the analysis executing portion onto the ring-shaped bus, and when the data has traveled around the ring-shaped bus and returned to itself, the slave station causes the analysis executing portion to delete the data, and switches the switch portion provided with itself to connect the loop of the ring-shaped bus.

In accordance with the seventh aspect, when data sent out by the station returns, the station switches the switch portion to connect the loop of the ring-shaped bus. This forms the loop of the ring-shaped bus to enable data communication.

According to an eighth aspect, in the fifth aspect, the master station authorizes a plurality of stations to receive data by using the token, and the stations other than those authorized to receive the data switch the switch portions provide with themselves to connect the loop of the ring-shaped bus, wherein the data passes each of the stations, whereby the plurality of stations are authorized to receive the data receive the data.

In accordance with the eighth aspect, a plurality of slave stations can receive the same data, which enables effective utilization of the bandwidth of the bus and high-speed response.

According to a ninth aspect, in the fifth aspect, each of the slave stations further comprises the token transfer function of the master station, wherein one of the stations connected to the ring-shaped bus can send out the token as a master station by exchanging the functions of the master station and the slave stations at any time.

In accordance with the ninth aspect, providing each slave station with a function of sending out a token allows the slave station to function as a master station.

According to a tenth aspect, in a communication network comprising a single master station and a plurality of slave stations connected to a bus, the master station sends out a token for each certain time and only a station authorized by the token outputs data, the master station includes a token management table for Isochronous data communication in which the overall band of the bus is previously sectioned into certain bands, and the master station rewrites contents of the Isochronous data communication token management table according to bandwidth required in the Isochronous data communication by itself or by each of the slave stations to manage the token and control the bandwidth.

In accordance with the tenth aspect, the master station includes a token management table for Isochronous data communication in which the overall band of the bus is previously sectioned into certain bands. When performing Isochronous data communication between stations, it rewrites the contents of the Isochronous data communication token management table according to bandwidths required in the communication between stations, and sequentially sends out the tokens for each certain time so that only specified stations can transmit/receive data. This facilitates management of the tokens and control of the transmission band in the master station.

According to an eleventh aspect, in the tenth aspect, the master station dynamically rewrites contents of the Isochronous data communication token management table which has been referred to by itself to virtually handle the Isochronous data communication token management table as a large table, thereby controlling the bandwidth more detailedly than the size of the installed Isochronous data communication token management table allows.

In accordance with the eleventh aspect, the master station dynamically rewrites the contents of the Isochronous data communication token management table when having referred to the table. This allows the master station to easily and detailedly manage the tokens and control the transmission band.

According to a twelfth aspect, in the tenth aspect, the master station has a token management table for Asynchronous data communication separately from the Isochronous data communication token management table, wherein the master station outputs a token for Asynchronous data communication for each certain time to perform Asynchronous data communication between stations.

In accordance with the twelfth aspect, since Asynchronous data communication can be performed as well for each certain time, management of the tokens and control of the transmission band for Isochronous data communication can be performed easily.

According to a thirteenth aspect, in the twelfth aspect, the master station obtains information about each of the stations by the Asynchronous data communication, wherein when a station is to perform Isochronous data communication, the master station reserves a bandwidth required by that station in the token management table for Isochronous data communication, and when a station requests deletion of the bandwidth already reserved, the master station deletes that bandwidth from the token management table for Isochronous data communication.

In accordance with the thirteenth aspect, the master station deletes bandwidth which has become unnecessary, which provides effective utilization of the bandwidth of the bus.

According to a fourteenth aspect, in the thirteenth aspect, the master station dynamically rewrites contents of the token management table for Isochronous data communication after referring to the token management table for Isochronous data communication, thereby virtually handling the token management table for Isochronous data communication as a large table.

In accordance with the fourteenth aspect, the master station virtually has a large Isochronous data communication table, so that it can detailedly manage the Isochronous data communication tokens and control the transmission band.

According to a fifteenth aspect, in the fourteenth aspect, management information for making the Isochronous data communication token management table correspond with Asynchronous data communication token management table is provided with Isochronous data communication and Asynchronous data communication token management tables, wherein the master station manages the Isochronous data communication and Asynchronous data communication token management tables on the basis of the management information, and controls the bandwidth while handling the Isochronous data communication and Asynchronous data communication token management tables as a pair by using the management information.

In accordance with the fifteenth aspect, the use of the management information allows the token management tables for the Isochronous data communication and the Asynchronous data communication to be treated as a pair, facilitating control of the bandwidth.

According to a sixteenth aspect, in the eleventh aspect, the master station includes a token management table for Asynchronous data communication separately from the token management table for Isochronous data communication, wherein the master station controls Asynchronous data communication between stations by outputting a token for the Asynchronous data communication for each certain time.

In accordance with the sixteenth aspect, since Asynchronous data communication can also be performed for each certain time, the tokens can be easily managed and the transmission band for Isochronous data communication can be easily controlled.

According to a seventeenth aspect, in the sixteenth aspect, the master station obtains information about each of the stations by the Asynchronous data communication, and when a station is to perform Isochronous data communication, the master station reserves a bandwidth requested by that station in the Isochronous data communication token management table, and when a station requests deletion of the bandwidth already reserved, the master station deletes that bandwidth from the Isochronous data communication token management table.

In accordance with the seventeenth aspect, since bandwidth which has become unnecessary is deleted by the master station, the bandwidth of the bus can be effectively used.

According to an eighteenth aspect, in the seventeenth aspect, after referring to the Isochronous data communication token management table, the master station dynamically rewrites contents of the Isochronous data communication token management table, thereby virtually handling the Isochronous data communication token management table as a large table.

In accordance with the eighteenth aspect, since the master station virtually has a large Isochronous data communication table, the tokens for Isochronous data communication can be detailedly managed and the transmission band can be detailedly controlled.

According to a nineteenth aspect, in the eighteenth aspect, management information for making the Isochronous data communication token management table correspond with Asynchronous data communication token management table is provided with the Isochronous data communication and Asynchronous data communication token management tables.

wherein the master station manages the Isochronous data communication and Asynchronous data communication token management tables on the basis of the management information, and controls the bandwidth by handling the Isochronous data communication and Asynchronous data communication token management tables as a pair by using the management information.

In accordance with the nineteenth aspect, the use of the management information allows the token management tables for the Isochronous data communication and the Asynchronous data communication to be handled as a pair, so that the bandwidth can be controlled easily.

According to twentieth to twenty-ninth aspects, in the tenth to nineteenth aspects, the bus is in the shape of a ring.

In accordance with the twentieth to twenty-ninth aspects, the token can be easily managed and the transmission band can be controlled easily because the bus is in the shape of a ring.

According to a thirtieth aspect, in a communication network comprising a single master station and a plurality of slave stations connected to a bus, the master station and each station are provided with ID information for identifying each station on the communication network, wherein the master station assigns a band on the network in response to a transmission bandwidth request from station, and transfers a token packet including the ID information for each station which requested the transmission bandwidth to reserve a transmission bandwidth requested by that station, and each station transfers a data packet which it has by using the transmission band reserved by the token packet, wherein the data packet includes no ID information.

In accordance with the thirtieth aspect, a token packet containing ID information is sent to reserve transmission bandwidth and a data packet, which is sent after it, contains no ID information. This enables transmission of Isochronous data requiring highly real-time performance.

According to a thirty-first aspect, in the thirtieth aspect, the master station sends out the token packets at constant time intervals.

In accordance with the thirty-first aspect, the master station sends out the token packets at constant time intervals, so that the token packets can be managed easily.

According to a thirty-second aspect, in the thirtieth aspect, the data packets sent on the bus include a plurality of types, with identifiers defined to identify the types, wherein the master station sends out a token packet containing the identifier.

In accordance with the thirty-second aspect, the master station sends out the token packets containing the identifiers. Accordingly, it is possible to correctly identify the plural types of data packets transferred on the bus.

According to a thirty-third aspect, in the thirtieth aspect, the number of transmissions of the token packets for each certain unit is set larger than the number of the transmissions determined on the basis of the transmission bandwidth request.

In accordance with the thirty-third aspect, the number of transmissions of the token packets is set larger than one corresponding to a request for transmission band from a slave station and therefore the slave station transmits data packets for a larger number of times. This allows the slave station to hold a less amount of data, leading to size reduction of its internal buffer memory.

According to a thirty-fourth aspect, in the thirtieth aspect, Isochronous data communication and Asynchronous data communication are performed in the communication network, wherein a token packet frame is formed including at least one token packet, the token packets being transmitted at constant intervals in the token packet frame, the token packets being provided with identifiers for identifying one of Isochronous data and Asynchronous data authorized to be transmitted by the master station, wherein the master station assigns a bandwidth necessary in the Isochronous data communication or Asynchronous data communication by using the token packet frame, and transfers the token packets such that the bandwidth required in the Isochronous data communication and the bandwidth required in the Asynchronous data communication are satisfied in the token packet frame.

In accordance with the thirty-fourth aspect, in a token packet frame, the token packets are transferred so that the bandwidth required for the Isochronous data communication and the bandwidth required for the Asynchronous data communication are satisfied, which enables the bandwidth to be more versatility assigned.

According to a thirty-fifth aspect, in the thirtieth aspect, the token packet also contains, as well as the ID information of a station requesting the transmission bandwidth (hereinafter referred to as a source station), the ID information of a station to receive the data packet transferred by that source station (hereinafter referred to as a destination station), wherein the destination station sends out, between the token packet and the data packet, a DS(Destination Status) packet showing whether the destination station can receive the data packet.

In accordance with the thirty-fifth aspect, a source station can know whether a destination station is in a data-receivable state with the above mentioned DS packet. This allows the source station to control transmission of the data packet depending on the destination station, leading to reliable communication.

According to a thirty-sixth aspect, in the thirtieth aspect, the master station is further provided with a clock oscillator for generating a clock which has a prescribed frequency, and the synchronization information provided to the token packet allows each slave station to recovery a clock which has the same frequency as that of the clock.

In accordance with the thirty-sixth aspect, the synchronization information provided to the token packet allows the slave station to operate with the same clock as the frequency of the clock oscillator in the master station.

According to a thirty-seventh aspect, in a communication network comprising a transmitting station for transmitting a packet and a receiving station for receiving the packet, the transmitting station adds a packet recognizing bit to the packet transmitted by itself to enable receiving timing recovery in the receiving station.

In accordance with the thirty-seventh aspect, the packet recognizing bit provided to a packet transmitted from a transmitting station allows the packet to be certainly received.

According to a thirty-eighth aspect, in the thirty-seventh aspect, the receiving station enables the receiving timing recovery in itself by using the packet recognizing bit added to the packet transmitted from the transmitting station.

In accordance with the thirty-eighth aspect, the receiving station can certainly receive the packet by using the packet recognizing bit.

A thirty-ninth aspect relates to a network control device in a communication network comprising a plurality of stations connected to a bus so that they can communicate, wherein the network control device is included in each of the stations to control transmission of transmitted data of itself. The network control device comprises:

a packet assembling circuit for assembling the transmitted data into a packet;

a packet recognizing bit adding circuit for adding a packet recognizing bit to the packet outputted from the transmitted packet assembling circuit for enabling receiving timing recovery in the station receiving the transmitted data, a bus switch portion for setting a state as to whether to enable transmission of the packet onto the bus from the packet recognizing bit adding circuit; and a transmission/reception control circuit for controlling the transmitted packet assembling circuit, the packet recognizing bit adding circuit and the bus switch portion, wherein the transmission/reception control circuit sets the bus switch portion to enable transmission of the packet only when transmitting the packet onto the bus.

In accordance with the thirty-ninth aspect, the network control device sends out a packet provided with the packet recognizing bit onto the bus so that the packet can certainly be received in the receiving station. The packet recognizing bit is detected from the packet inputted from the bus and the packet can thus be certainly received.

A fortieth aspect relates to a network control device in a communication network comprising a plurality of stations connected to a bus so that they can communicate, wherein the network control device is included in each of the stations to control reception of data transmitted through the bus, the data is in the form of a packet, and the packet is provided with a packet recognizing bit for enabling receiving timing recovery in the station receiving the transmitted data.

The network control device comprises, a received packet recognizing bit identifying circuit for recovering receiving timing of the packet by using the packet recognizing bit provided to the packet, a received packet disassembling circuit for taking out the data from the received packet, a bus switch portion for setting whether to transfer the packet transmitted through the bus to the station located at downstream of the bus, and a transmission/reception control circuit for controlling the received packet recognizing bit adding circuit, the received packet disassembling circuit and the bus switch portion, wherein the transmission/reception control circuit sets the bus switch portion to enable transmission to the station located at downstream when receiving the packet.

According to the fortieth aspect, the network control device enables certain reception of the packet by using the packet recognizing bit of the received packet. Furthermore, the network control device transfers the packet inputted from the bus toward downstream by using the bus switch and then the packet can travel around the bus in a short time.

These and other objects, features, aspects and advantages of the present invention will become more apparent from the following detailed description of the present invention when taken in conjunction with the accompanying drawings.

BRIEF DESCRIPTION OF THE DRAWINGS

FIG. 17 is a diagram showing a new token packet (Iso) management table 1503 produced by the master station 11a shown in FIG. 1 in a storage region separate from the current token table management portion 233.

FIG. 29 is a diagram illustrating one effect of this communication network, which shows an example in which external equipment of stations operate with an asynchronous system clock 2200 independent of the system clock 2100 of the master station 11a.

FIG. 32 is a diagram showing the format of the token 3105 and the transmission data 3106 used in the LAN shown in FIG. 31.

DESCRIPTION OF THE PREFERRED EMBODIMENTS

Figure 1:
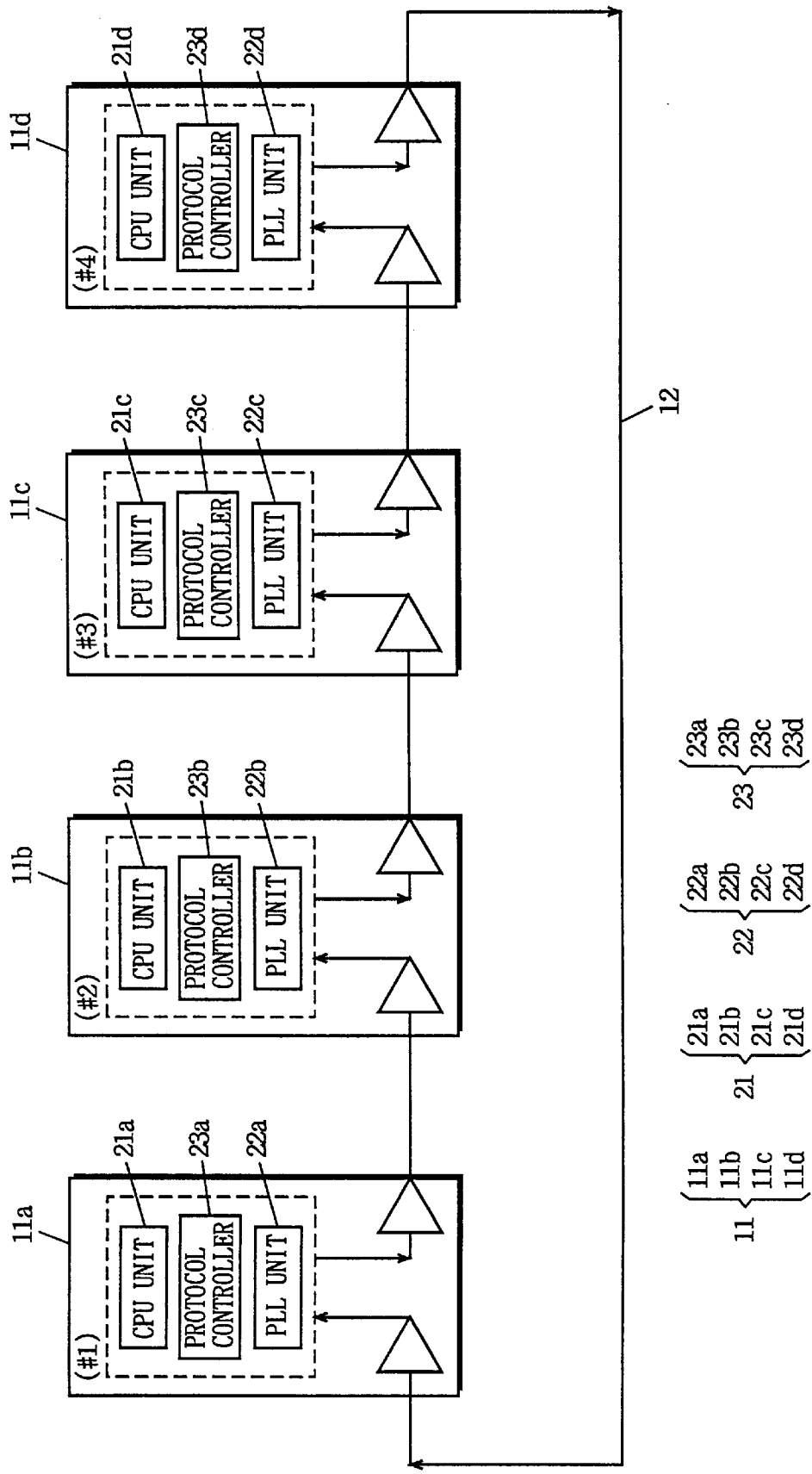
FIG. 1 is a diagram showing the overall structure of a communication network according to an embodiment of the present invention.

FIG. 1 shows the overall structure of a communication network according to one embodiment of the present invention. In FIG. 1, a plurality of stations 11 (the diagram shows four) are connected to a ring-shaped bus 12 such that they can communicate with each other. One of the four stations 11 (hereinafter referred to as a master station 11a) sends out three types of token packets: in detail, token packets (Asyn) and token packets (Iso) for controlling Asynchronous data communication and Isochronous data communication, and a null token packet in case of no communication. (Note that Asynchronous is referred as Asyn and Isochronous is referred as Iso in some part in the description.) The remaining three stations 11 (hereinafter referred to as slave stations 11b, 11c and 11d) perform Asynchronous data or Isochronous data communication on the basis of the two types of token packets. The master station 11a can also make Asynchronous data or Isochronous data communication.

The individual stations 11 have the same structure. Generally, as shown in FIG. 1, each includes a CPU portion 21, a PLL portion 22, a protocol controller 23 and a clock oscillator 2100. Now the structure of each station 11 will be explained in detail referring to FIG. 2.

The CPU portion 21 executes operations explained later. The CPU portion 21 of the master station 11a also outputs information necessary to generate token packets.

The PLL portion 22 is formed of a known PLL (Phase Locked Loop) circuit, which recovers a system clock from token packets transmitted from the upstream ring-shaped bus 12.

The clock oscillator 2100 is provided with at least the master station 11a to generate a system clock having a prescribed frequency.

Figure 2:
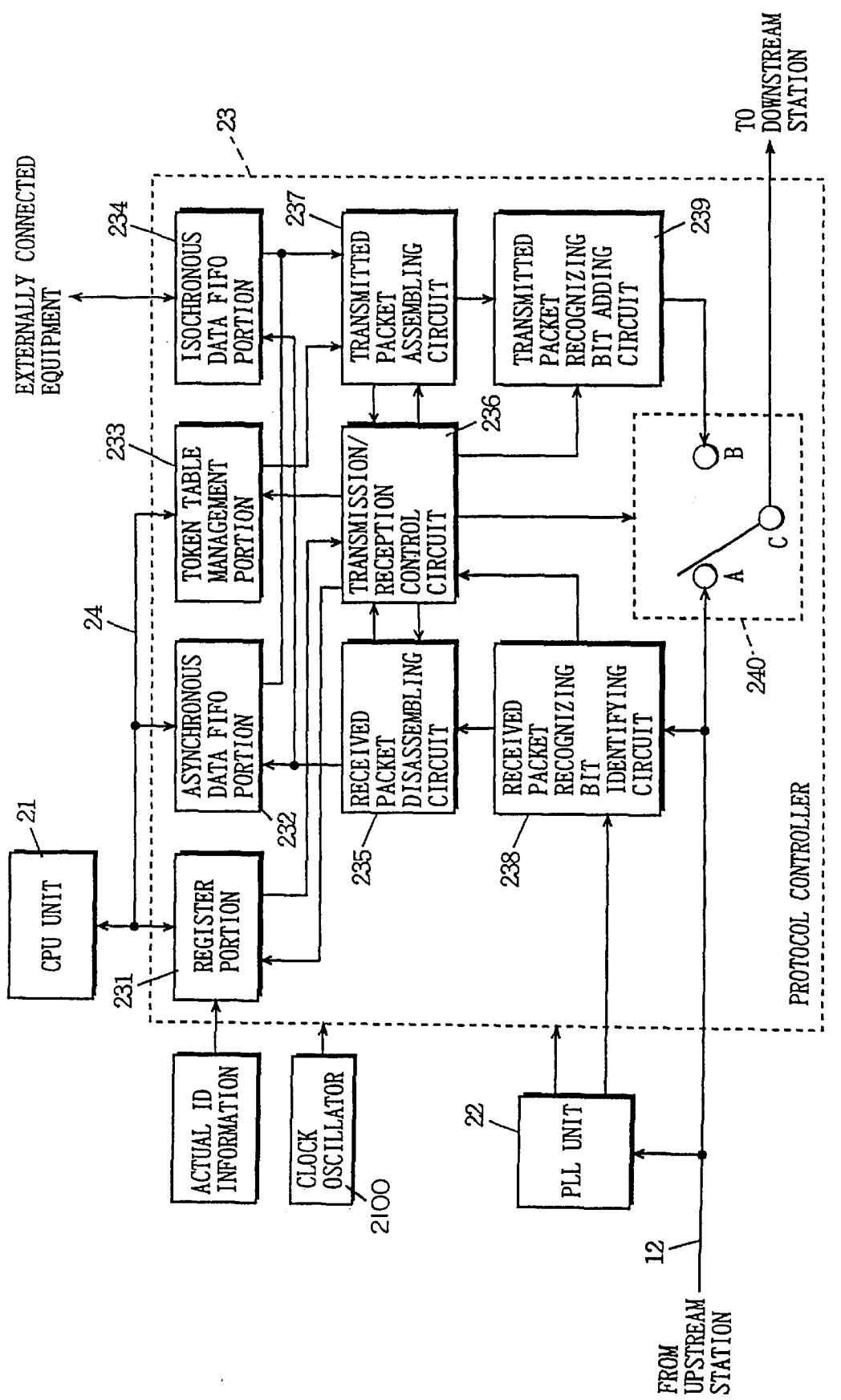
FIG. 2 is a block diagram showing, in detail, the structure of the station 11 shown in FIG. 1.

As shown in the area surrounded by the dotted line in FIG. 2, the protocol controller 23, for executing processes based on the protocol of this communication network, includes a register portion 231, an Asynchronous data FIFO(First In First Out) portion 232, a token table management portion 233, an Isochronous data FIFO (First In First Out) portion 234, a received packet disassembling circuit 235, a transmission/reception control circuit 236, the transmitted packet assembling circuit 237, a received packet recognizing bit identifying circuit 238, a transmitted packet recognizing bit adding circuit 239, and a bus switch portion 240. While the processes performed by these components will be shown later, the bus switch portion 240 will now be described.

The bus switch portion 240 includes a terminal A coupled to the upstream ring-shaped bus 12, a terminal B coupled to the transmitted packet recognizing bit adding circuit 239, and a terminal C coupled to the downstream ring-shaped bus 12. In the description, mentioning "the bus switch portion 240 is closed" indicates that the terminal A and the terminal C are connected and mentioning "the bus switch portion 240 is open" indicates that the terminal B and the terminal C are connected.

The alphabets a–d on the right sides of the reference numerals assigned to the components correspond to the stations 11a–11d hereinafter. For example, "CPU portion 21a" indicates the CPU portion 21 of the master station 11a.

The above-mentioned token management portion 233 may be provided with at least the master station 11a.

Next, the procedure of data communication in this communication network will be explained referring to the flow chart of FIG. 3 in regard to "initialization mode" and "steady mode", respectively.

"Initialization Mode"

As a precondition for entering the initialization mode, actual ID information (described later) #1 is stored in the register portion 231a of the master station 11a and actual ID information #2–#4 are set for the slave stations 11b–11d with dip switches, for example. In this condition, when a power-source is turned on for this communication network, or when system reset is made, the stations 11a–11d start with the bus switch portions 240a–240d opened. Accordingly, the loop formed by this communication network is disconnected in the stations 11a–11d.

Immediately after the activation, the CPU portion 21a starts processing according to an initial program (not shown) read from a ROM, for example. In this processing, the master station 11a generates and sends out an IM token 400 (refer to FIG. 4, described later) for providing dummy ID information to the slave stations 11 (Step S301). The dummy ID information is, in principle, identification information which the master station 11a temporarily provides to specify each slave station 11. It is now assumed that dummy ID information α-γ are provided in such a manner that no overlap occurs among the slave stations 11a–11d.

Now, the operation performed when the master station 11a sends out an IM packet 400 (refer to FIG. 4) will be described. First, the CPU portion 21a outputs dummy ID information and a dummy ID information setting command. The dummy ID information and a dummy ID information setting command are inputted into the transmitted packet assembling circuit 237a via the system bus 24 and the Asynchronous data FIFO portion 232a. An IM packet (a packet in the initialization mode) is assembled by the transmitted packet assembling circuit 237a using the dummy ID information, the dummy ID information setting command and PLL synchronization information. Then the transmitted packet recognizing bit adding circuit 239a provides a packet recognizing bit to the head of the IM packet 400. When such preparations have been made, the transmission/reception control circuit 236a causes the IM packet 400 to be outputted onto the ring-shaped bus 12 from the bus switch portion 240a which is open at present.

Figure 4:
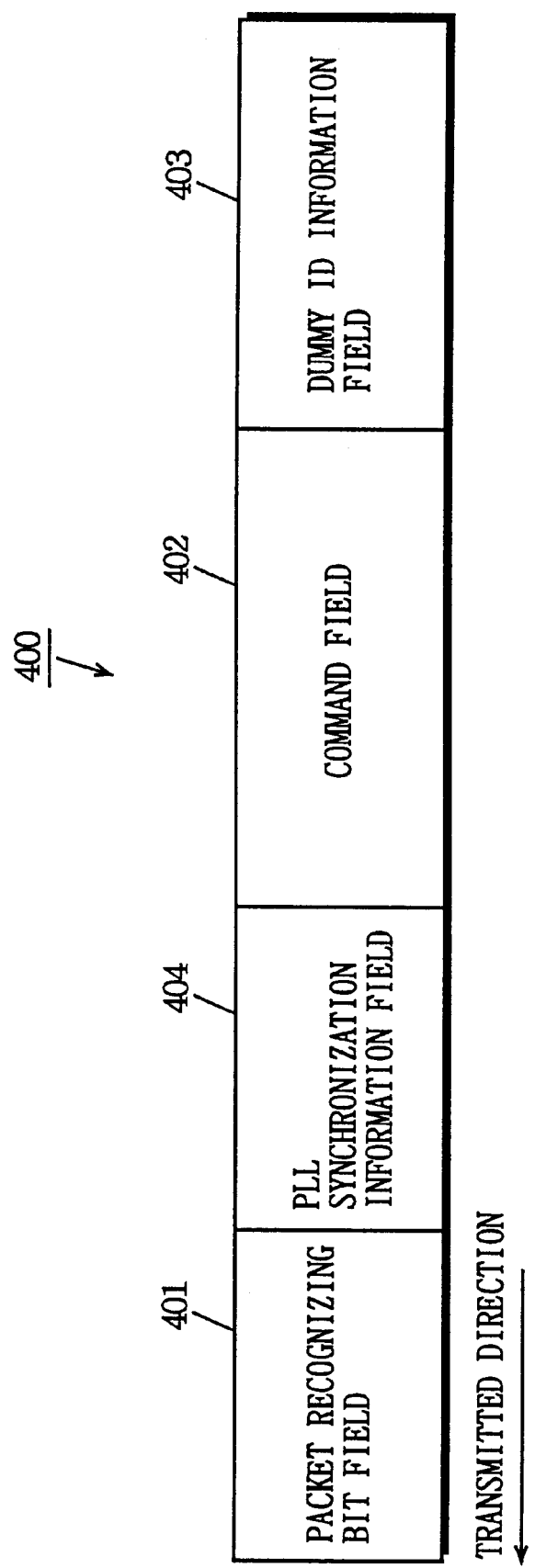
FIG. 4 is a diagram showing the frame format of the IM packet 400 used in the communication network shown in FIG. 1.

The IM packet 400 has the format shown in FIG. 4 when sent out onto the ring-shaped bus 12. In FIG. 4, a packet recognizing bit is stored in the packet recognizing bit field 401 and PLL synchronization information is stored in a PLL synchronization information field 404. The packet recognizing bit is used for receiving timing recovery and PLL synchronization information is used for clock recovery. The dummy ID information setting command is stored in the command field 402 and the dummy ID information is stored in the dummy ID information field 403.

Next, an operation performed when each slave station 11 responds to the IM packet 400 will be explained. The PLL portion 22 of a slave station 11 recovers the system clock on the basis of PLL synchronization information stored in the input packet 400. Thus the components of the slave station 11 operate with the same system clock as the master station 11a. The received packet recognizing bit identifying circuit 238 recovers receiving timing on the basis of the packet recognizing bit in the input packet 400 to receive the input packet 400. The received packet 400 is inputted to the received packet disassembling circuit 235 and the transmission/reception control circuit 236. The transmission/reception control circuit 236 detects the dummy ID information setting command from the command field 402 to recognize that the received packet 400 is an IM packet 400. Then the transmission/reception control circuit 236 causes the received packet disassembling circuit 235 to output the dummy ID information stored in the dummy ID information field 403 to the Asynchronous data FIFO portion 232, and closes the bus switch portion 240b which was open when the IM packet 400 was received. This causes the slave station 11 to ignore IM packets 400 coming thereafter. The CPU portion 21 receives the dummy ID information from the Asynchronous data FIFO portion 232 through the system bus 24 and stores it in the register portion 231. The dummy ID information is thus provided to the slave station 11.

Next, the procedure in which the master station 11a provides the dummy ID information α-γ to the slave stations 11b–11d will be explained.

The master station 11a sends out the first IM packet 400 as stated above (Step S301). The dummy ID information α is stored in the dummy ID information field 403. The first IM packet 400 is transmitted only to the slave station 11b located right downstream of the master station 11a because all the bus switch portions 240 of all the stations 11 are open at present.

The transmission/reception control circuit 236b detects the dummy ID information setting command in the command field 402 to recognize the received packet 400, which has been subjected to the above-described system clock recovery and the receiving timing recovery, as the IM packet. Then it makes the received packet disassembling circuit 235 output the dummy ID information α in the dummy ID information field 403 to the Asynchronous data FIFO portion 232b, and closes the bus switch portion 240b. The CPU portion 21b stores the dummy ID information α received through the system bus 24b from the Asynchronous data FIFO portion 232b into the register portion 231b.

When the IM packet 400 sent out last time does not return after a certain time has passed (Step S302), the master station 11a sends out the next IM packet 400 (Step S301). This IM packet 400 contains dummy ID information β, which is transferred to the slave station 11c through the closed bus switch portion 240b of the slave station 11b. The slave station 11c operates similarly to the slave station 11b to store the dummy ID information β into the register portion 231c and closes the bus switch portion 240c.

When the IM token 400 sent out last time does not come back after a certain time has passed (Step S302), the master station 11a sends out the next IM packet 400 (Step S301). This IM packet 400 contains the dummy ID information γ, which is transferred to the slave station 11d through the closed bus switch portions 240b and 240c of the slave stations 11b and 11c. The slave station 11d operates similarly to the slave stations 11b and 11c to store the dummy ID information γ into the register portion 231d and closes the bus switch portion 240d.

Figure 5:
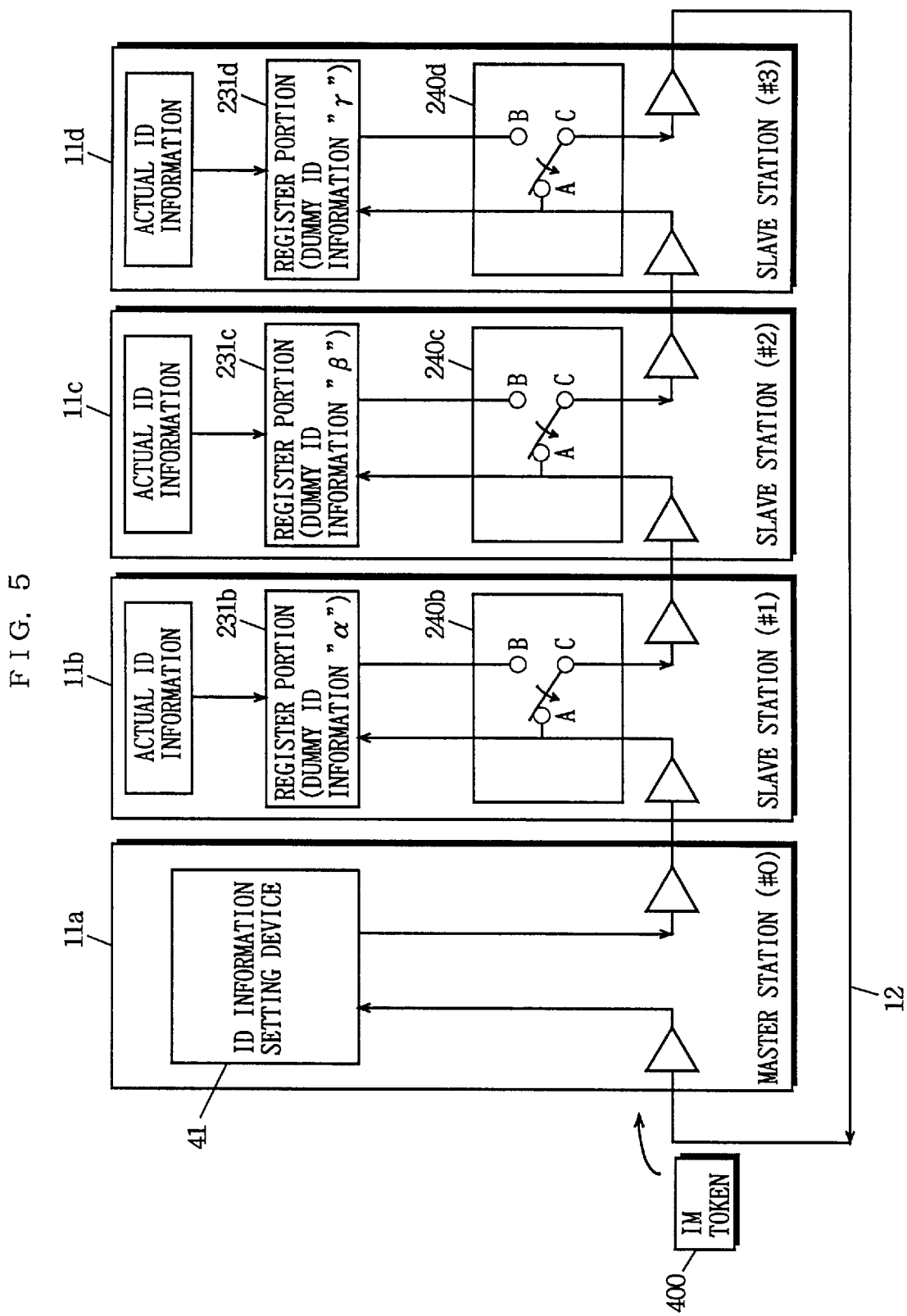
FIG. 5 is a diagram illustrating this network after the master station 11a has transmitted the IM packets 400 three times.

FIG. 5 is a diagram showing this communication network after the master station 11a has sent out the IM packet 400 three times. In FIG. 5, the ID information setting device 41 is formed of the CPU portion 21a and the protocol controller 23a of the master station 11a. In the slave stations 11b–11d, the bus switch portions 240b–240d are closed and the dummy ID information α-γ are stored in the register portions 231b–231d. At this time, the actual ID information shown in FIG. 5 are merely set in the slave stations 11 with dip switches, for example.

When the IM token 400 sent out last time does not come back after a certain time has passed (Step S302), the master station 11a sends out the next IM packet 400 (Step S301). This IM packet 400 circulates around the loop through all of the closed bus switch portions 240b–240d of the slave stations 11b–11d and comes back to the master station 11a. (Refer to FIG. 5) At this time, the transmission/reception control circuit 236a detects the dummy ID information setting command from the command field 402 to recognize the received packet 400 subjected to the system clock recovery and the receiving timing recovery as an IM token 400, and recognizes that the IM token 400 sent out by itself has returned (Step S302). Next, the transmission/reception control circuit 236*a* causes the detected dummy ID information setting command to be outputted to the Asynchronous data FIFO portion 232*a*. When receiving the dummy ID information setting command through the system bus 24*a*, the CPU 21*a* determines that the dummy ID information have been set in all slave stations 11. The CPU portion 21*a* counts the number of outputs of the dummy ID information setting commands, for example, to recognize the number of slave stations in the communication network (in this embodiment, three).

Next, the master station 11*a* generates and sends out token packets (Asyn) for asking actual ID information of each slave station 11 by using the dummy ID information (Step S303(*a*) and (*b*)).

First, an operation performed when the master station 11*a* generates and sends out a token packet (Asyn) 600 (refer to FIG. 6) will be explained. The token packet (Asyn) for inquiring the actual ID information and the token packet (Asyn) for collecting the actual ID information are generated in the same way, hence the way for generating the token packet (Asyn) for collecting the actual ID will be described below.

The CPU portion 21*a* outputs the actual ID information #1 of itself taken out from the register portion 231*a*, one of the dummy ID information given to the slave station, and the packet type information. The packet type information is for indicating whether the token packet is for Asynchronous data communication or for Isochronous data communication. The Asynchronous data communication packet type information and the Isochronous data communication packet type information are referred to as first packet type information and second packet type information hereinafter. Hence, in Step S303, the first packet type information is outputted.

The actual ID information #1 which is written into the token packet (Asyn) management table by CPU portion 21*a*, the dummy ID information and the first packet type information are inputted to the transmitted packet assembling circuit 237*a*. The token packet (Asyn) is assembled by the transmitted packet assembling circuit 237*a* using these inputted information (the actual ID information, the dummy ID information and the first packet type information) and the PLL synchronization information (previously set in the transmitted packet assembling circuit 237*a* in this embodiment). Then a packet recognizing bit is added to the head of the token packet (Asyn) 600 by the transmitted packet recognizing bit adding circuit 239*a*.

When such preparations have been made, the transmission/reception control circuit 236*a* causes the token packet (Asyn) 600 to be outputted from the currently open bus switch portion 240*a* onto the ring-shaped bus 12.

Figure 6:
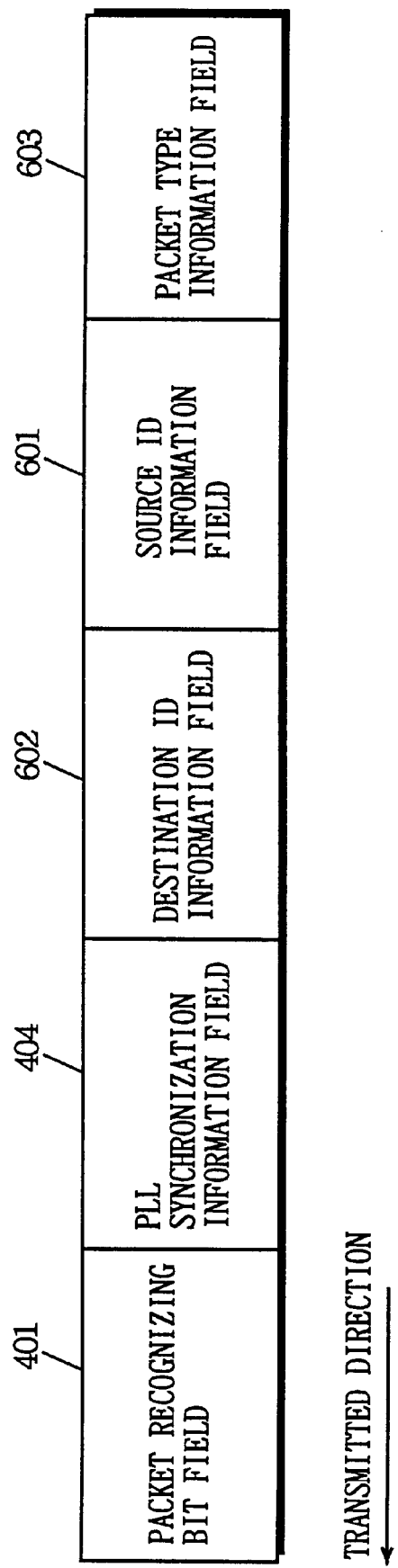
FIG. 6 is a diagram showing the format of the token packet (Asyn) 600 or 1400, or the token packet (Iso) used in the communication network shown in FIG. 1.

The token packet (Asyn) 600 has the format shown in FIG. 6 when outputted onto the ring-shaped bus 12, which is formed of a source ID information field 601, a destination ID information field 602, and a packet type information field 603.

In FIG. 6, stored in the source ID information field 601 is ID information of a station 11 which is authorized to send out Asynchronous data by the token packet (Asyn) 600. As the master station 11*a* currently knows only the dummy ID information of the slave stations 11, only the dummy ID information, rather than the actual ID information, is stored in the source ID information field 601. Stored in the destination ID information field 602 is the ID information of a station 11 which is to receive the Asynchronous data transferred according to this token packet (Asyn) 600. Since the token packets (Asyn) 600 are sent so that the master station 11*a* can collect their respective actual ID information of the slave stations 11, stored in the destination ID information field 602 is only the actual ID information #1 of the master station 11*a* and stored in the packet type information field 603 is only the first packet type information. Since the packet recognizing bit field 401 and PLL synchronization information field 404 are the same as that shown in FIG. 4, it is indicated by the same reference numeral and not described again.

Next, the operation performed when each slave station 11 responds to the token packet (Asyn) 600 (this is for collecting actual ID) will be described. Since the PLL portion 22 of a slave station 11 recovers the system clock on the basis of PLL synchronization information in the input token packet (Asyn) 600 as well, the components of the slave station 11 described below operate with the same system clock as the master station 11*a*. The received packet recognizing bit identifying circuit 238 recovers the receiving timing on the basis of the packet recognizing bit stored in the input packet 600 to receive that input packet 600.

The transmission/reception control circuit 236 accepts the received packet 600 and detects the first packet type information from the packet type information field 603 to recognize that the received packet 600 is a token packet (Asyn) 600.

Next, the transmission/reception control circuit 236 determines whether the dummy ID information extracted from the source ID information field 601 of the token packet (Asyn) 600 and the dummy ID information of itself extracted from the register portion 231 coincide. When the two pieces of dummy ID information coincide, the transmission/reception control circuit 236 takes out and outputs the actual ID information of itself set with a dip switch, for example. This actual ID information is assembled into a data packet (Asyn) 700 by the transmitted packet assembling circuit 237. Then, the packet recognizing bit is added to the head of the data packet (Asyn) 700 in the packet recognizing bit adding circuit 239*a*.

When such preparations have been made, the transmission/reception control circuit 236 opens the bus switch portion 240 and causes the data packet (Asyn) 700 to be outputted onto the ring-shaped bus 12 through the transmitted packet recognizing bit adding circuit 239 and the bus switch portion 240. This data packet (Asyn) 700 is outputted to the ring-shaped bus 12 after a certain time has passed since the slave station 11 received the token packet (Asyn) 600.

After the data packet (Asyn) 700 was sent out, the transmission/reception control circuit 236 closes the bus switch portion 240.

Figure 7:
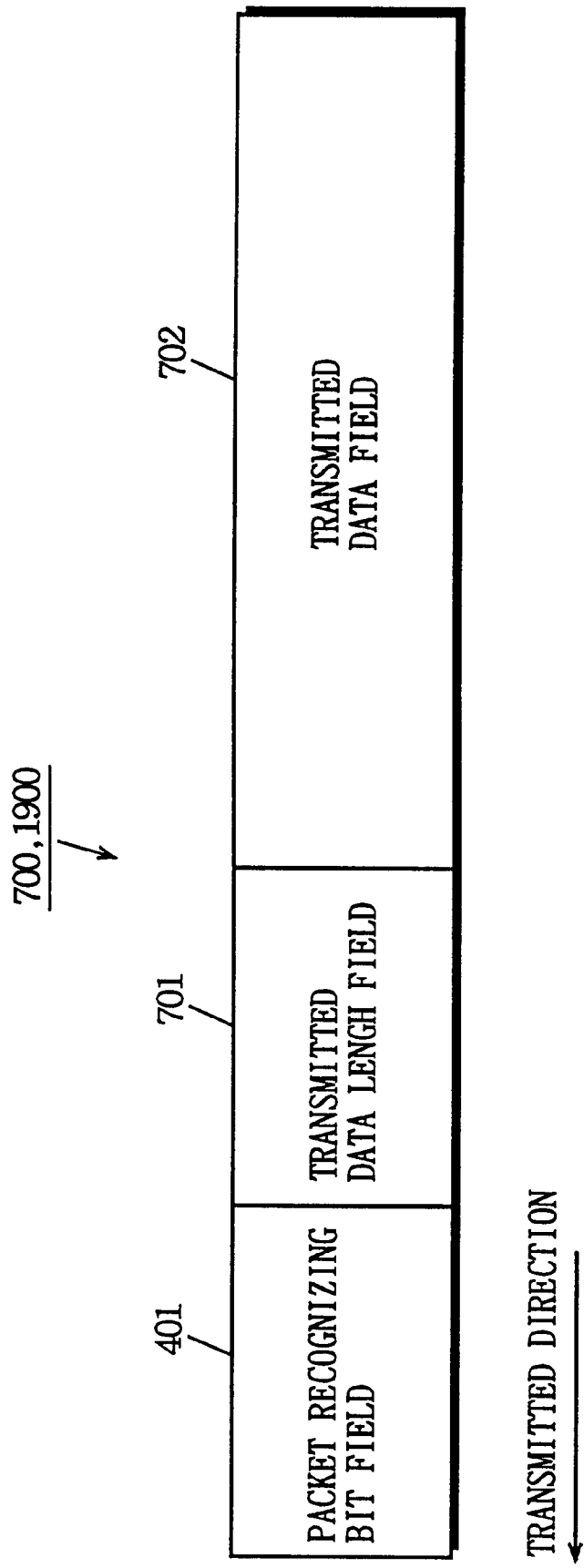
FIG. 7 is a diagram showing the format of the data packet (Asyn) 700 or 1900 used in the communication network shown in FIG. 1.

The format of the data packet (Asyn) 700 includes, as shown in FIG. 7, a packet recognizing bit field 401, a transmitted data length field 701 and a transmitted data field 702. Stored in the transmitted data field 702 is actual ID information of the slave station. The transmitted data length field 701 is not described herein since it is not related to the invention and neither is the packet recognizing bit field 401 since it is the same as shown in FIG. 4.

On the other hand, when the aforementioned two pieces of dummy ID information disagree, the transmission/reception control circuit 236 waits for the reception of the next token packet (Asyn) 600 without generating a data packet (Asyn) 700.

As is clear from the description above, a slave station 11 opens the bus switch portion 240 only when sending out the data packet (Asyn) 700. Hence, the token packet (Asyn) 600 is transmitted toward a downstream station 11, and the data packet (Asyn) 700 is transmitted following after that token packet (Asyn) 600.

Next, the operations in the master station 11 for discarding the token packet (Asyn) 600 and for receiving the data packet (Asyn) 700 sent out from a slave station 11 will be described. The token packet (Asyn) 600 is received by the received packet recognizing bit identifying circuit 238a and inputted to the transmission/reception control circuit 236a.

The transmission/reception control circuit 236a detects the first packet type information from the packet type information field 603 of the received packet 600 to recognize that the received packet 600 is a token packet (Asyn) 600.

Next, the transmission/reception control circuit 236a closes the bus switch portion 240a which is opening at the time the token packet (Asyn) 600 is received. Next, the transmission/reception control circuit 236a determines whether the ID information taken out from the destination ID information field 602 and the actual ID information of itself taken out from the register portion 231 agree. When the two pieces of ID information agree, it recognizes that a data packet (Asyn) 700 directed to itself will come. The transmission/reception control circuits 236b–236d in the slave stations 11b–11d, too, determine whether the ID information taken out from the destination ID information field 602 and the actual ID information for themselves taken out from the register portions 231 agree, but it is not described.

Having recognized that the data packet (Asyn) 700 will be transmitted, the transmission/reception control circuit 236a waits for the data packet (Asyn) 700 to be inputted to the received packet disassembling circuit 235a with the bus switch portion 240a closed, which is opening when the token packet (Asyn) 600 is received. Also, at this time, the transmission/reception control circuit 236a discards and deletes the token packet (Asyn) 600 which was sent out by the master station 11a and traveled around the loop.

The master station 11a receives the data packet (Asyn) 700 when a certain time has passed after reception of the token packet (Asyn) 600. At this time, the transmission/reception control circuit 236a causes the actual ID information of the slave station 11 stored in the transmitted data field 702 of the data packet (Asyn) 700 inputted to the received packet disassembling circuit 235 to be outputted to the Asynchronous data FIFO portion 232a. The CPU portion 21a receives the actual ID information of the slave station 11 from the Asynchronous data FIFO portion 232a through the system bus 24a. The master station 11a can thus collect the actual ID information of the slave station 11.

Next, the operation of discarding the data packet (Asyn) 700 in the slave station 11 will be described. This data packet (Asyn) travels around the loop to come back to the source slave station 11. In this slave station 11, the data packet (Asyn) 700 is received by the received packet recognizing bit identifying circuit 238 and inputted to the transmission/reception control circuit 236.

The transmission/reception control circuit 236 can recognize that the received packet 600 is the data packet (Asyn) 700 since it itself has sent the data packet (Asyn) 700.

Next, the transmission/reception control circuit 236a discards and deletes the current input data packet (Asyn) 700, then closes the bus switch portion 240 which is opening when the data packet (Asyn) 700 is received.

Next, the procedure in which the master station 11a confirms the actual ID information of the salve stations 11b–11d by using token packets (Asyn) 600 containing the dummy ID information α-γ will be described referring to the description on operations provided above and FIGS. 2, 3, and FIGS. 8–12. FIGS. 8–12 are diagrams illustrating the flow of the token packet (Asyn) 600 and the data packet (Asyn) 700 in this communication network.

Figure 8:
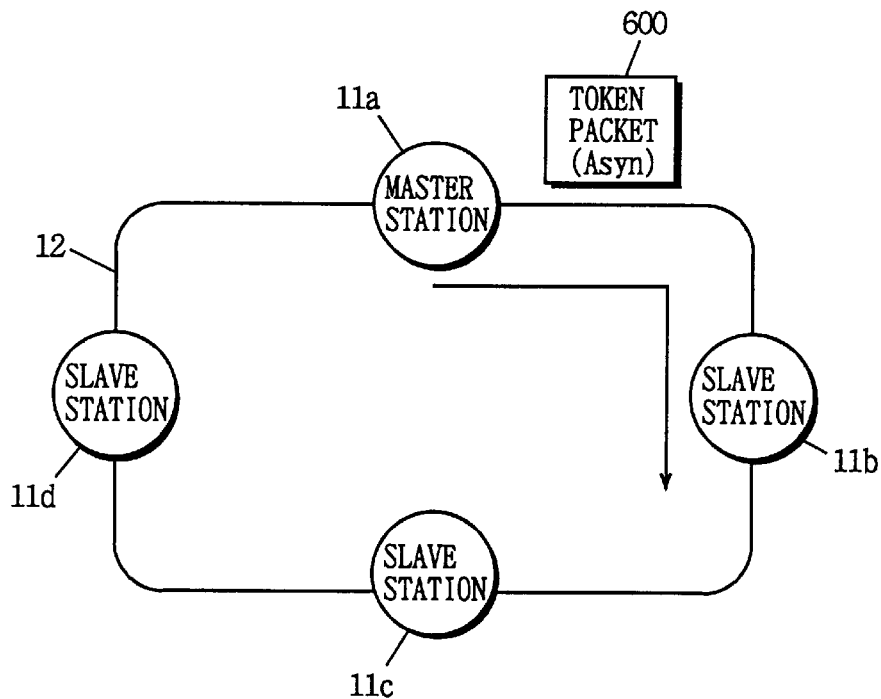
FIG. 8–FIG. 12 are diagrams illustrating the flow of the token packet (Asyn) 600 or the data packet (Asyn) 700 in the communication network shown in FIG. 1.
Figure 9:
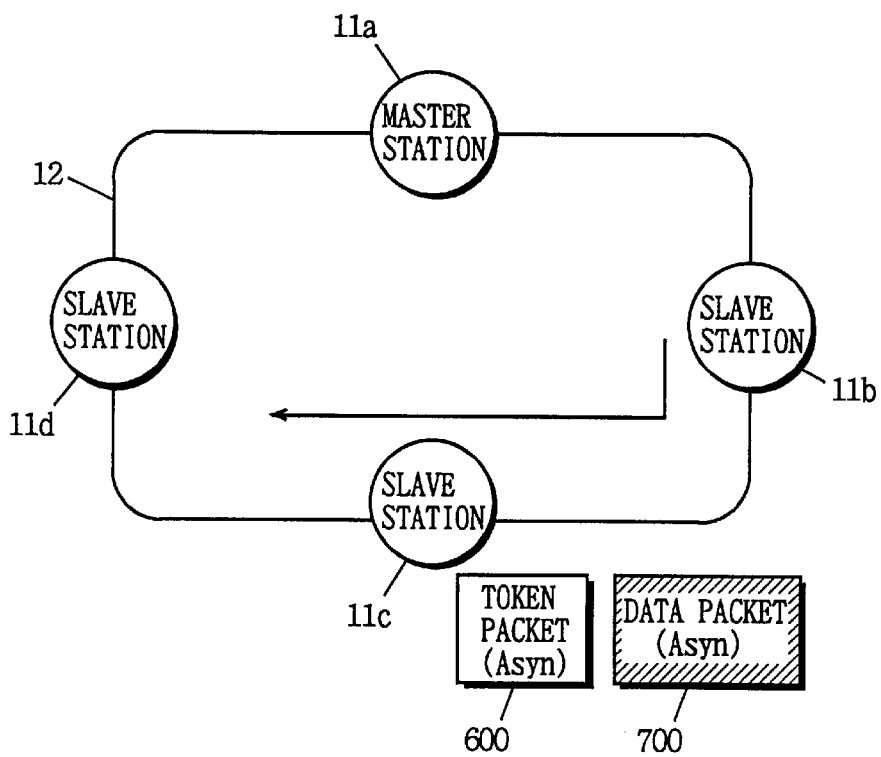

First, the master station 11a outputs the token packet (Asyn) 600 (for inquiring the actual ID information) including the actual ID information #1 and the dummy ID information α into the source and destination ID information fields 601 and 602. (FIG. 3: Step S303(a)). When receiving the token packet (Asyn), the master station 11a sends the command for inquiring the actual ID information as the data packet into the slave station. Then, the master station 11a generates the token packet (Asyn) 600 and sends it out as shown in FIG. 8 (FIG. 3; Step S303(b)). The dummy ID information α and the actual ID information #1 are stored in the source and destination ID information fields 601 and 602. Accordingly, the token packet (Asyn) 600 is for authorizing the slave station 11b to transmit Asynchronous data to the master station 11a. The token packet (Asyn) 600 sent out from the master station 11a passes the slave station 11b. (Refer to the arrow in FIG. 8.) The slave station 11b operates as stated above to recognize that it was authorized to transmit Asynchronous data, and generates and sends out the data packet (Asyn) 700 containing its actual ID information #2 in the transmitted data field 702. At this time, the slave station 11b opens the bus switch portion 240b when sending out the data packet (Asyn) 700, so that the token packet (Asyn) 700 is transferred following after the token packet (Asyn) 600, as shown in FIG. 9.

Figure 10:
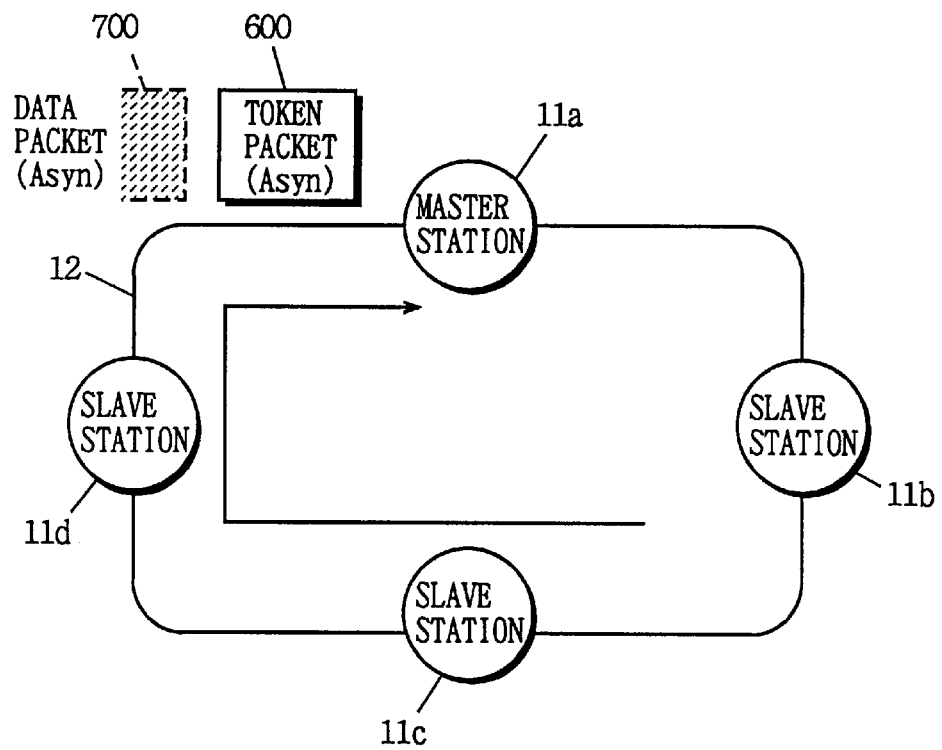

Then, as shown in FIG. 10, the token packet (Asyn) 600 travels around the ring-shaped bus 12 and comes back to the master station 11a. The master station 11a operates as described above to discard and delete the token packet (Asyn) 600, and recognizes that a data packet (Asyn) 700 will be directed to itself. Sub sequently, the master station 11a receives the data packet (Asyn) 700, and obtains and confirms the actual ID information #2 of the slave station 11b (FIG. 3; Step S304). Then the master station 11a determines whether it has asked all slave stations 11 for actual ID information (FIG. 3; Step S305) on the basis of the number of dummy ID information provided in Step S301 (the number of slave stations connected to this communication network; three in this embodiment) and the number of transmissions of the token packets (Asyn) 600 in Step S303. At this time, as is clear from the description above, it determines that such inquiries have not been finished, and returns to Step S303.

Figure 11:
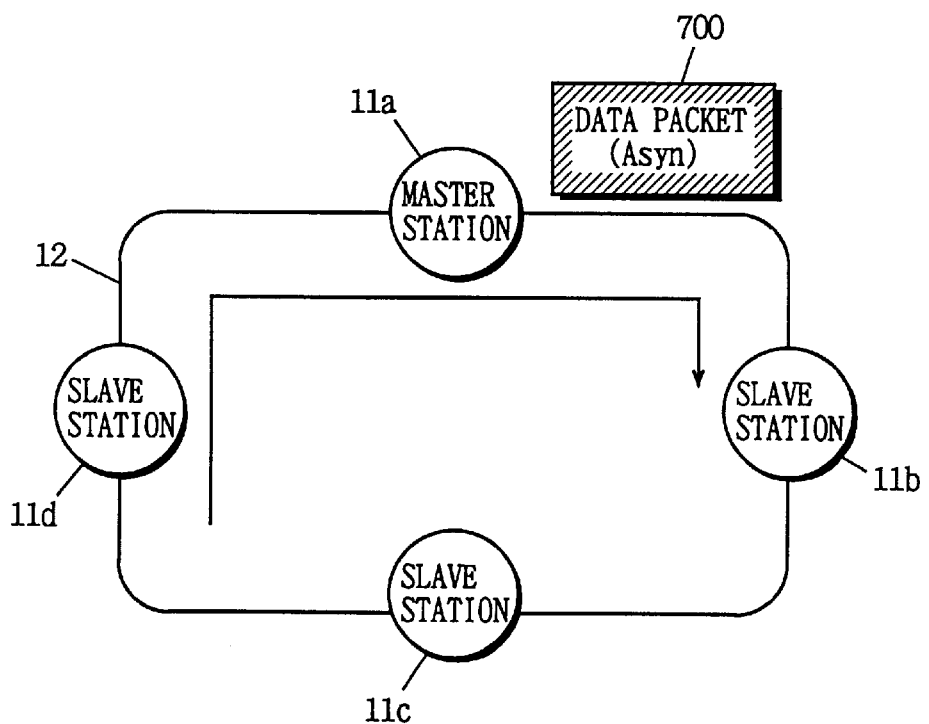

The master station 11a closes the bus switch portion 240a when having received and recognized the token packet (Asyn) 600 sent out by itself. The data packet (Asyn) 700 therefore travels around the ring-shaped bus 12 and comes back to the slave station 11b, as shown in FIG. 11. The slave station 11b discards and deletes the data packet (Asyn) 700 sent out by itself.

Figure 12:
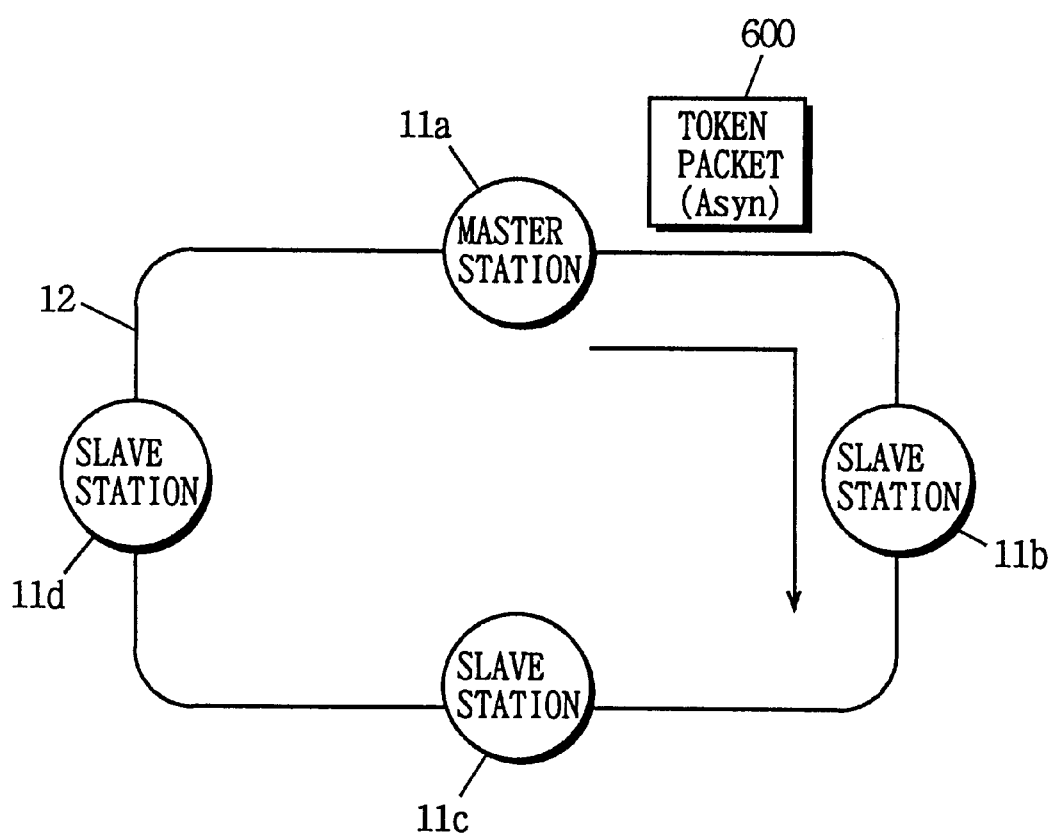

When returning to Step S303, the master station 11a outputs the token packet (Asyn) 600 including the actual ID information #1 and the dummy information β into the source and destination ID information fields 601 and 602. (Step S303(a)). When receiving the token packet (Asyn), the master station 11a sends out the command for inquiring the actual ID information as the data packet to the slave station 11c. Then, the master station 11a generates the next token packet (Asyn) 600 and sends it out as shown in FIG. 12 (FIG. 3; Step S303(b)). Stored in the source and destination ID information fields 601 and 602 are the dummy ID information β and the actual ID information #1. While the token packet (Asyn) 600 travels around the ring-shaped bus 12 to return to the master station 11a and is deleted, it passes the slave station 11c located in the course of the ring-shaped bus 12. At this time, the slave station 11c recognizes that it is authorized to transmit Asynchronous data, and generates and sends out a data packet (Asyn) 700 containing its actual ID information #3 in the transmitted data field 702. This data packet (Asyn) 700 travels around the loop as well, and returns to the slave station 11c and is deleted by that station 11c. While traveling around the loop, it passes the master station 11a. At this time, the master station 11a receives the data packet (Asyn) 700 to obtain and confirm the actual ID information #3 of the slave station 11b (FIG. 3; Step S304). Subsequently, performing Step S305, the master station 11a determines that inquiries about actual ID information to all slave stations 11 have not been finished, and hence returns to Step S303.

When returning to Step S303, the master station 11a outputs the token packet (Asyn) 600 including the actual ID information #1 and the dummy information γ into the source and destination ID information fields 601 and 602. (Step S303(a)). When receiving the token packet (Asyn), the master station 11a sends out the command for inquiring the actual ID information as the data packet to the slave station 11d. Then, as shown in FIG. 12, the master station 11a generates a token packet (Asyn) 600 storing the dummy ID information γ and the actual ID information #1 in the source and destination ID information fields 601 an 602 and sends it out (FIG. 3; Step S303(b)). This token packet (Asyn) 600 also travels around the loop and is deleted by the master station 11a. While traveling around the loop, it passes the slave station 11d. At this time, the slave station 11d recognizes that it is authorized to transmit Asynchronous data, and then generates and sends out a data packet (Asyn) 700 storing its own actual ID information #4 in the transmitted data field 702. This data packet (Asyn) 700 travels around the loop and is deleted by the slave station 11d. While traveling around the loop, it passes the master station 11a. At this time, the master station 11a receives this data packet (Asyn) 700 to obtain and confirm the actual ID information #4 of the slave station 11d (FIG. 3; Step S304). Subsequently, the master station 11a determines that inquiries about actual ID information to all slave stations 11 have been finished, as shown in Step S305 (FIG. 3; Step S305).

Figure 13:
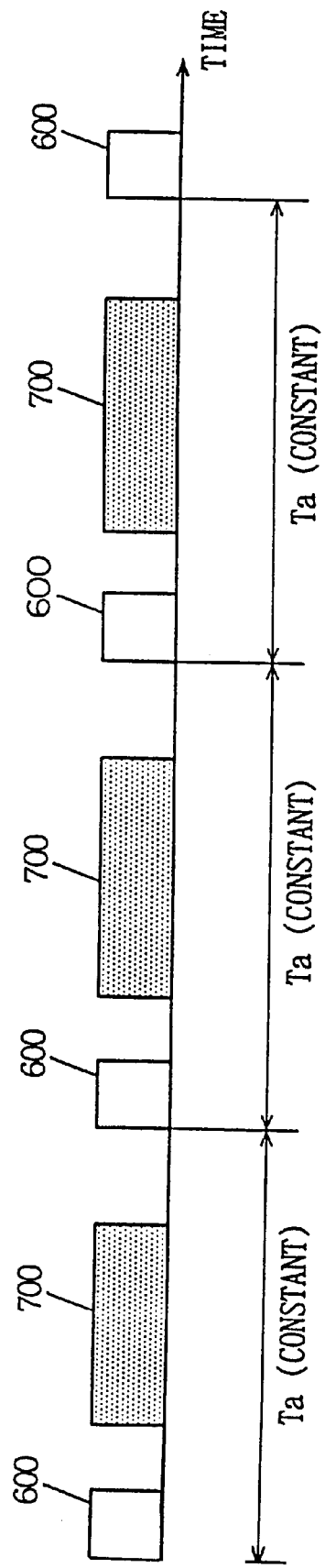
FIG. 13 is a diagram showing, on the time domain, the token packets (Asyn) 600 and the data packets (Asyn) 700 transferred on the ring-shaped bus 12 of this network in case Steps S303–305 in the flow chart in FIG. 3 are repeatedly performed.

FIG. 13 shows, on the time domain, the token packets (Asyn) 600 and the data packets (Asyn) 700 sent on the ring-shaped bus 12 of this communication network by repeatedly performing Steps S303 to 305. As shown in FIG. 13, after a token packet (Asyn) 600 sent by the master station 11a, a slave station 11 allowed to transmit Asynchronous data by that token packet (Asyn) 600 sends out a data packet (Asyn) 700. When provided with transmission authorization by the token packet (Asyn) sent from the master station 11a, each slave station 11 immediately generates a data packet (Asyn) containing transmission data held inside and sends it out onto the ring-shaped bus 12. Accordingly, it is effective even in communication of Isochronous data such as picture and sound requiring high speed and highly real-time performance.

Furthermore, the master station 11a in order asks the slave stations 11b–11d for their actual ID information set with dip switches or the like by using the dummy ID information assigned to the slave stations 11b–11d in Step S301 (refer to FIG. 3) and confirms the information (Steps S303–S305). When having finished the inquiries about actual ID information to all slave stations 11, the master station 11a checks to see if any of the collected actual ID information overlap.

If no actual ID information overlap, the master station 11a causes the actual ID information of the slave stations 11b–11d set with dip switches to be written into the register portions 231b–231d. Accordingly, data communication in the steady state described later is performed on the basis of the actual ID information.

If the check shows that some actual ID information overlap, the master station 11a does not allow the register portions 231 of the corresponding slave stations 11 to write the actual ID information previously set with dip switches, leaving the stored dummy ID information provided in Step S301 as they are. In this communication network, as described above, dummy ID information is provided to inquire actual ID information previously set in each slave station 11. Hence, it is possible to check to see if any actual ID information overlap. If actual ID information overlap, it is possible to reserve the history.

If an overlap occurs in the actual ID information collected by the master station 11a, the corresponding slave stations use the dummy ID information in the steady state described later. Accordingly, on the bus of this communication network, data packets are not sent out at the same time from a plurality of slave stations 11, which ensures correct data communication without collision of data packets. Furthermore, even if overlapping actual ID information are set due to erroneous operation, this communication network correctly operates without the need for externally setting the actual ID information again.

It is also possible to store plural pieces of actual ID information in the destination ID information field 602 of a token packet (Asyn). This allows a station 11 which gained the transmission authorization to transmit a data packet to a plurality of stations 11. In this case, as well, the stations 11 to receive the transmission data operate as explained above.

As described above, the stations 11 all have the same structure in this communication network. That is to say, switching the functions as a master station and a slave station as needed enables any of the stations in the communication network to send out a token as a master station.

Furthermore, the stations 11a–11d allow token packets and data packets to which they are not related to merely electrically or mechanically pass therethrough by switching the bus switches 240a–240d.

Figure 14:
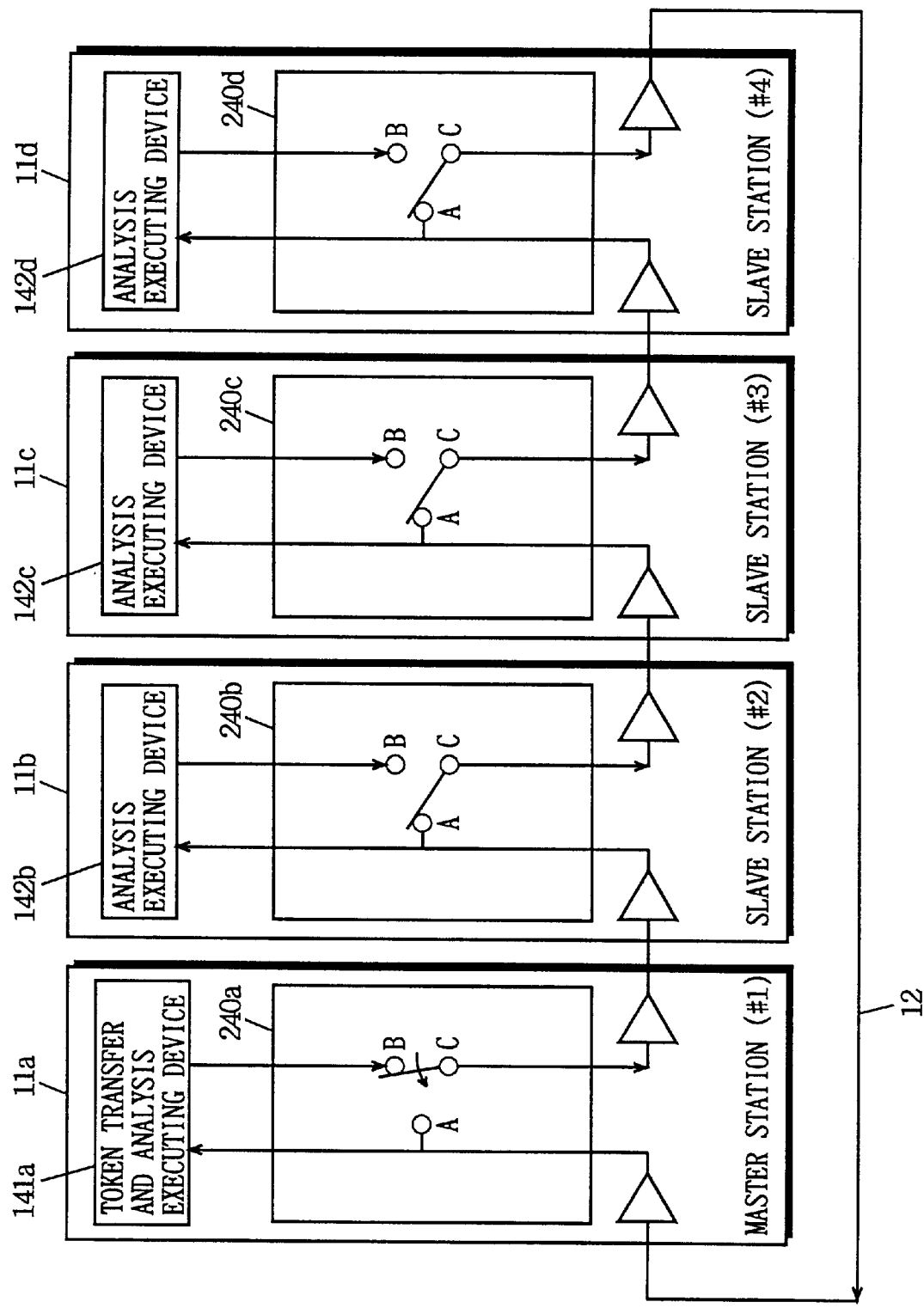
FIG. 14 is a diagram illustrating one effect in the communication network shown in FIG. 1.

FIG. 14 is a diagram showing the outline of one effect in this communication network. In FIG. 14, the master station 11a is formed of a token transfer and analysis executing device 141a and a bus switch portion 240a. The token transfer and analysis executing device 141a is formed of the CPU portion 21a and the protocol controller 23a shown in FIG. 1 (excluding the bus switch portion 240a (refer to FIG. 2)). The slave stations 11b–11d are formed of analysis executing devices 142b–142d and bus switch portions 240b–240d. The analysis executing devices 142b–142d are formed of the CPU portions 21b–21d and the protocol controllers 23b–23d shown in FIG. 1 (excluding the bus switch portions 240b–240d (refer to FIG. 2)).

As have been described above, when transferring data from the slave station 11b to the master station 11a, for example, the master station 11a opens the bus switch portion 240a (connects it to the terminal B) to disconnect the loop of the ring-shaped bus 12, and generates and sends out a token packet (Asyn) from the token transfer and analysis executing device 141a. This token packet (Asyn) is for authorizing the slave station 11b to transmit Asynchronous data to the master station 11a. At the time when this token packet (Asyn) is sent out onto the ring-shaped bus 12, the bus switch portions 240b–240d of the slave stations 11b–11d are closed (connected to the terminal A). As the token packet (Asyn) comes through the ring-shaped bus 12, the analysis executing devices 142b–142d acquire the token packet (Asyn). The analysis executing devices 142b–142d analyze the token packet (Asyn) to determine whether they are authorized to transmit a data packet (Asyn), or a data packet (Asyn) will be directed to them, or neither.

The token packet (Asyn) travels around the ring-shaped bus 12 to come back to the master station 11a, where the token transfer and analysis executing device 141a analyzes the token packet (Asyn) as well. The token packet (Asyn) is then deleted. Detecting that the token packet (Asyn) has returned, the master station 11a closes the bus switch portion 240a (switches it from the terminal B to the terminal A) to connect the loop of the ring-shaped bus 12.

As a result of analysis of the token packet (Asyn) in the master station 11a and the slave stations 11b–11d, only the slave station 11b opens the bus switch portion 240b (switches it from the terminal A to the terminal B) when a certain time has passed after the acquisition of the token packet (Asyn) to disconnect the loop formed of the ring-shaped bus 12 and sends a data packet (Asyn) from the analysis executing device 142b.

As a result of analysis of the token packet (Asyn) in the master station 11a and the slave stations 11b–11d, the master station 11a closes the bus switch portion 240a (switches it to the terminal A) to transfer the data packet (Asyn) on the ring-shaped bus 12 to the downstream and also acquires the data packet (Asyn) into the token transfer and analysis executing device 141a. Thus the data packet (Asyn) has been sent from the slave station 11b into the master station 11a.

Similarly to the token packet (Asyn), the data packet (Asyn) also travels around the ring-shaped bus 12 to come back to the slave station 11b which has sent out that data packet (Asyn) and is deleted in the analysis executing device 412b. The slave station 11b, detecting that the data packet (Asyn) has returned, closes the bus switch portion 240b (switches it from the terminal B to the terminal A) to connect the loop formed of the ring-shaped bus 12.

Subsequently, the above-described sequence is repeated in this communication network to transmit token packets (Asyn) and following data packets (Asyn).

As is clear from the brief description above, the token packets and the data packets are transferred downstream via the bus switch portions 240 of the stations 11. Accordingly, the time required for executing analysis operations in stations unrelated to the communication does not add to the time required for the round trip of the token packet and the data packet in the loop. This allows the token packets and the data packets to be transmitted at higher speed on the ring-shaped bus 12 than in conventional Master Slave Networks. This allows almost no time lag due to analysis operations, from which conventional Master Slave Network have suffered. This communication network thus realizes high utilization efficiency and high-speed response.

The switching of the bus switch portions 240 described referring FIG. 14 is also used in Isochronous data communication in the steady state described below.

"Steady Mode"

When Step S305 ends, this communication network enters a steady mode to enable Isochronous data communication.

Now, first, an operation performed when the master station 11a generates and sends out a token packet (Asyn) 1400 (refer to FIG. 6) will be explained referring to FIG. 2 and others. The CPU portion 21a writes communication management information in a token packet (Asyn) management table 1501 held in a token table management portion 233a referring the actual ID information of the slave station 11 collected in the initialization mode.

Figure 15:
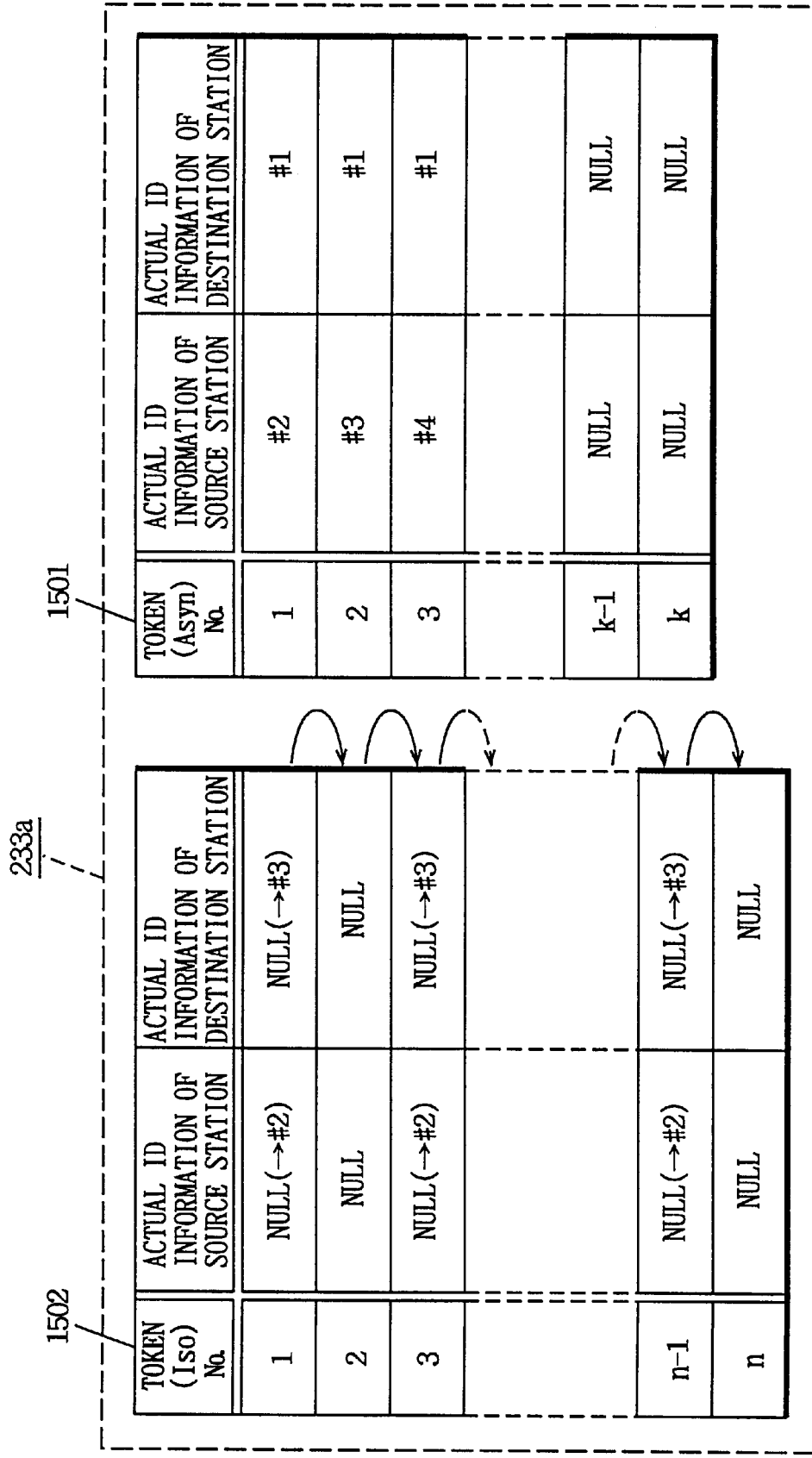
FIG. 15 is a diagram showing the token table management portion 233 shown in FIG. 2, or the token packet (Asyn) management table 1501 and the token packet (Iso) management table 1502 held in one in the master station 11a shown in FIG. 1.

FIG. 15 is a diagram showing the token packet (Asyn) management table 1501 and a token packet (Iso) management table 1502. Only the token packet (Asyn) management table 1501 will be described now and the token packet (Iso) management table 1502 will be described later. In FIG. 15, the token packet (Asyn) management table 1501 is created on the basis of the actual ID information collected in the above-described initialization mode, which is for managing transfer of the token packets (Asyn) 1400. The token packet (Asyn) management table 1501 holds k pieces (k is an integer of 1 or larger) of communication management information containing actual ID information of source and destination stations for individual token (Asyn) numbers. The destination and source actual ID information are the same as the above-described source and destination ID information. In FIG. 15, for more definite description, communication management information (actual ID information of a source station, actual ID information of a destination station) (#2, #1), (#3, #1) and (#4, #1) are set for the token (Asyn) numbers 1, 2, and 3, and (null, null) is set for the following token (Asyn) numbers 4-k.

The token packet (Asyn) management table 1501 is created by CPU portion 21a. The transmission/reception control curcuit 236a gets access to a token table management portion 233a to output one communication management information and the first packet type information from the token packet (Asyn) management table to the packet assembling circuit 237a. The first and second packet type information is held in the token table management portion 233a in the initialization mode. A token packet (Asyn) 1400 is assembled by the packet assembling circuit 237a on the basis of the communication management information, the first packet type information and the PLL synchronization information. Subsequently, the transmitted packet recognizing bit adding circuit 239 provides a packet recognizing bit to the head of the token packet (Asyn) 1400 and then it is sent out onto the ring-shaped bus 12 from the opened bus switch portion 240a.

The token packet (Asyn) 1400 has the same format shown in FIG. 6 when sent out onto the ring-shaped bus 12. The same reference numerals are therefore assigned to the individual fields of the token packet (Asyn) 1400 without repeating description thereof.

Described next is the operation in which the master station 11a sends out a token packet (Iso) 1500 every time a certain time Ta passes after sending out the token packet (Asyn) 1400. However, it is not explained in detail because it is the same as that for the token packet (Asyn) 1400 except that the transmission/reception control circuit 236a gets access to the token table management portion 233a and is held in the token packet (Iso) management table 1502 to output the communication management information and the second type packet information according to the token (Iso) number into the packet assembling circuit 237a.

The token packet (Iso) management table 1502 is for managing transmission of the token packets (Iso) 1500, which, as shown in FIG. 15, holds n pieces of (n is an integer of 1 or lager) communication management information for individual token (Iso) numbers, similarly to that described above. The token packet (Iso) management table 1502 holds communication management information (null, null) for all token (Iso) numbers immediately after entering the steady mode. This table 1502 is dynamically rewritten on the basis of statuses of the stations 11 collected by the master station 11a with the token packets (Asyn) 1400. (This rewrite will be explained later referring to FIG. 17 and FIG. 18.)

The token packet (Iso) 1500 has the same format as that shown in FIG. 6 when sent out onto the ring-shaped bus 12, except that it has the second packet type information stored in the packet type information field 603.

Next, an operation performed when each slave station 11 responds to the token packet (Asyn) 1400 will be explained. Since it is almost the same as that for responding to the token packet (Asyn) 600, differences only will be explained.

The transmission/reception control circuit 236 determines whether actual ID information extracted from the source ID information field 601 of the token packet (Asyn) 1400 agree with its own actual ID information extracted from the register portion 231. When the two pieces of actual ID information agree, it checks to see if the status information is stored in the Asynchronous data FIFO portion 232. The status information includes the actual ID information of a station serving as a source of Isochronous data (i.e., the actual ID information of itself), the actual ID information of a station serving as a destination of that Isochronous data, and a transmission rate for that Isochronous data.

When the Asynchronous data FIFO portion 232 contains the status information, the transmission/reception control circuit 236 causes the status information to be outputted. The status information is assembled into a data packet (Asyn) 1700 by the transmitted packet assembling circuit 237. Transmitting timing of this data packet (Asyn) 1700 and switching of the bus switch portion 240 are the same as those for the data packet (Asyn) 700 described above.

The data packet (Asyn) 1700 has a format including the transmission data length field 701 and the transmitted data field 702, like that shown in FIG. 7. While the status information is stored in the transmitted data field 702, Asynchronous data other than the status information, e.g., AV equipment control commands, may be stored.

Next, operation when a slave station 11 responds to the token packet (Iso) 1500 will be explained. In a slave station 11, the received packet 1500 subjected to clock recovery and receiving timing recovery is inputted to the transmission/reception control circuit 236, as explained above. The transmission/reception control circuit 236 detects the second packet type information from the packet type information field 603 of the received packet 1500 to recognize that the received packet 1500 is a token packet (Iso) 1500.

Next, the transmission/reception control circuit 236 determines whether the ID information extracted from the destination ID information field 602 agrees with the actual ID information of itself extracted from the register portion 231. When the two pieces of actual ID information agree with each other, it recognizes that a data packet (Iso) will be directed to itself after a certain time.

Next, the transmission/reception control circuit 236 checks to see if a buffer memory (not shown) provided in that station 11 for receiving data packets (Iso) and the like has capacity enough to receive the transmitted data packet (Iso), and generates and outputs receiving station operation mode information showing its condition. This output information is assembled into a DS packet 1800 by the transmitted packet assembling circuit 237. Adding the packet recognizing bit being added to the DS packet 1800, transmitting timing of the DS packet 1800 and switching of the bus switch portion 240 for it are performed in the same way as those for the data packet (Asyn) 1700.

Figure 16:
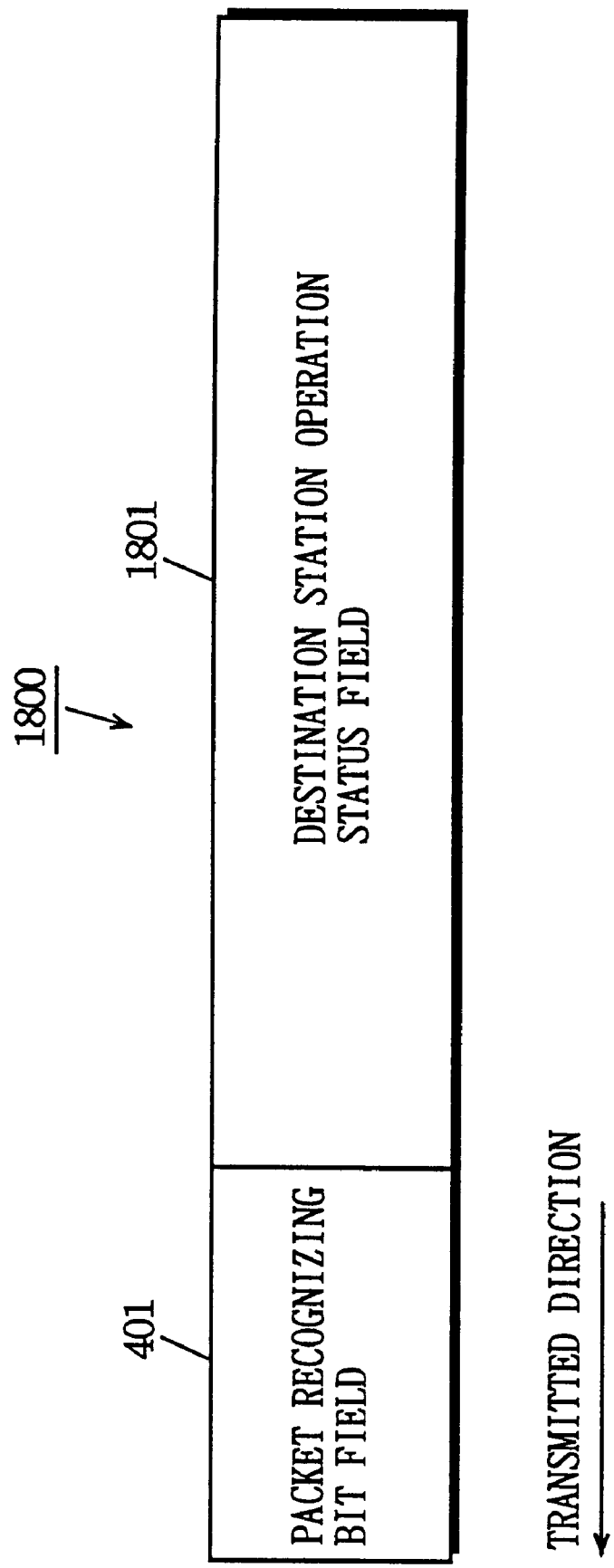
FIG. 16 is a diagram showing the format of the DS packet 1800 used in the communication network shown in FIG. 1.

The format of the DS packet 1800 includes a packet recognizing bit field 401 and a destination station operation mode information field 1801 as shown in FIG. 16. As is clear from the description, stored in this destination station operation mode information field 1801 is information indicating whether it is in a receivable state for the data packet (Iso). The packet recognizing bit field 401 is as stated above.

Also, the transmission/reception control circuit 236 determines whether the ID information taken out from the source ID information field 601 agrees with its own actual ID information taken out from the register portion 231. When the two pieces of actual ID information agree with each other, it recognizes that the DS packet 1800 will be transferred after a certain time passes and waits for its input.

Next, if the transmission/reception control circuit 236 detects a receivable state from the input DS packet 1800, it causes Isochronous data which is produced by an external equipment (AV equipment) and stored in the Isochronous data FIFO portion 234 to be outputted. The Isochronous data is assembled into a data packet (Iso) 1900 by the transmitted packet assembling circuit 237. When such preparations have been made, the transmission/reception control circuit 236 opens the bus switch portion 240 and causes the data packet (Iso) 1900 to be outputted onto the ring-shaped bus 12 through the transmitted packet recognizing bit adding circuit 239 and the bus switch portion 240. This data packet (Iso) 1900 is outputted onto the ring-shaped bus 12 after an elapse of a certain time after the slave station 11 received the DS packet 1800. The transmission/reception control circuit 236 closes the bus switch portion 240 after the data packet (Iso) 1900 has been sent out.

Since the data packet (Iso) 1900 has the same format as that shown in FIG. 7, each field is designated by the same reference numeral and not described again. However, note that Isochronous data generated by an external equipment is stored in the transmitted data field 702.

Next, the operation of receiving a token packet (Asyn or Iso) 1400 or 1500 in the master station 11a will be explained. At this time, the transmission/reception control circuit 236a of the master station 11a, like explained for the slave station 11, detects the first or second packet type information from the packet type information field 603 of the received packet 1400 or 1500 to recognize that the received packet 1400 or 1500 is a token packet (Asyn or Iso) 1400 or 1500.

Next, the transmission/reception control circuit 236a closes the bus switch portion 240a which was open when the token packet (Asyn or Iso) 1400 or 1500 was received.

Subsequently, the transmission/reception control circuit 236a determines whether the source ID information or the destination ID information agree with the actual ID information of the master station 11a on the basis of the token packet (Asyn or Iso) 1400 or 1500, like explained for the slave station 11, and operates according to the results of the determinations.

Subsequently, the transmission/reception control circuit 236a discards and deletes the token that it sent out, and generates and sends out such a token packet (Asyn or Iso) 1400 or 1500 as explained above.

Next, the operation of discarding the DS packet 1800 and the operation of receiving Isochronous data in a slave station 11 serving as a destination of the Isochronous data will be explained. The DS packet 1800 travels around the loop to come back to the source slave station 11. In the slave station 11, the DS packet 1800 is received by the received packet recognizing bit identifying circuit 238 and inputted to the transmission/reception control circuit 236.

As the transmission/reception control circuit 236 stores what DS packet 1800 it has sent out, it can recognize that the received packet 1800 is the DS packet 1800.

Next, the transmission/reception control circuit 236 discards and deletes the current input DS packet 1800, then closes the bus switch portion 240 which is opening when the DS packet 1800 is received.

Furthermore, the transmission/reception control circuit 246, when it transferred the DS packet 1800 with the receiving station operation status information field 1801 indicating a receivable state, waits for input of a data packet (Iso) 1900 into the received packet disassembling circuit 235.

Next, operation of discarding the data packet (Iso) 1900 in a slave station 11 serving as a source of Isochronous data will be described. The data packet (Iso) 1900 travels around the loop and comes back to the source slave station 11. In the slave station 11, the data packet (Iso) 1900 is received in the received packet recognizing bit identifying circuit 238 and inputted to the transmission/reception control circuit 236.

The transmission/reception control circuit 236 stores that it has sent out the data packet (Iso) 1900, so that it can recognize that the received packet 1900 is the data packet (Iso) 1900.

Next, the transmission/reception control circuit 236 discards and deletes the current input data packet (Iso) 1900, then closes the bus switch portion 240 which was open when the data packet (Iso) 1900 was received.

Next, the procedure of Isochronous data transmission in this communication network will be explained referring to the description on operations provided above, FIGS. 2 and 3, and FIGS. 8–24. FIGS. 19–24 are diagrams illustrating the flow of the token packet (Iso) 1900 (refer to FIG. 6), the receiving station data transfer packet 1800 (refer to FIG. 16), or the data packet (Iso) 1900 (refer to FIG. 7).

Figure 3:
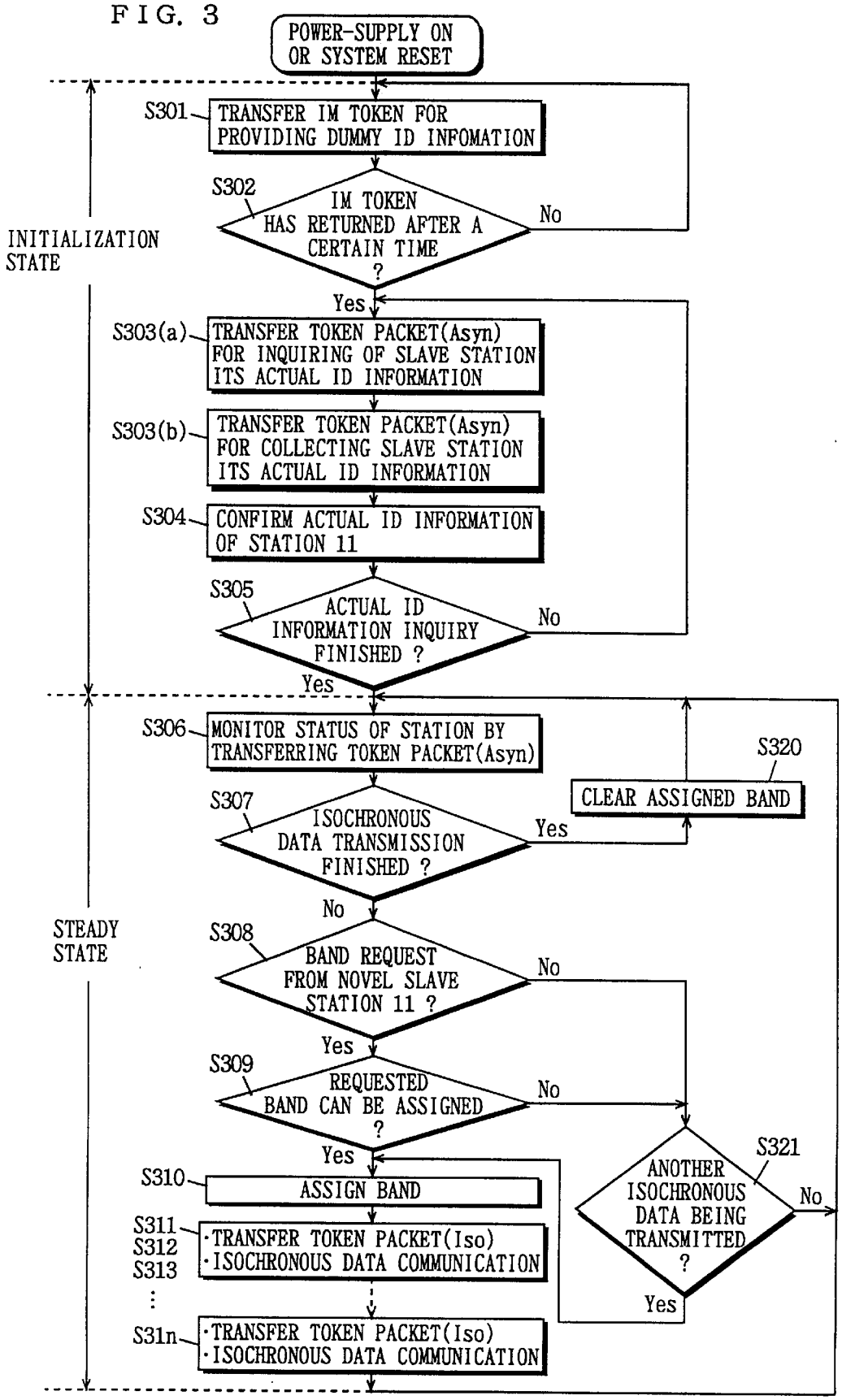
FIG. 3 is a flow chart showing the procedure of data communication in the communication network shown in FIG. 1.

The master station 11a refers to the communication management information according to a token (Asyn) number in the token packet (Asyn) management table 1501 to generate and send out one token packet (Asyn) 1400, thereby monitoring the status of a slave station 11 (FIG. 3; Step S306). The first token packet (Asyn) 1400 is produced according to the communication management information (#2, #1) corresponding to the token (Asyn) number "1", wherein "#2" and "#1" are stored in the source and destination actual ID information fields 601 and 602, and the first packet type information is stored in the packet type information field 603. This token packet (Asyn) 1400 authorizes the slave station 11b to transmit a data packet (Asyn) 700 to the master station 11a.

The token packet (Asyn) 1400 sent out from the master station 11a passes the slave station 11b, as shown in FIG. 8. At this time, the slave station 11b performs the operation explained above to recognize that it is authorized to transmit Asynchronous data. Then, only when the status information is stored in the Asynchronous data FIFO portion 232, it generates and sends out a data packet (Asyn) 700 (refer to FIG. 7). To specifically explain, it is assumed that the status information includes "#2" as actual ID information of a station to serve as a source of Isochronous data, "#3" as actual ID information of a station to serve as a destination, and a certain transmission rate for the Isochronous data. That is to say, the salve station 11b requests the master station 11a for bandwidth necessary for the Isochronous data communication to the slave station 11c by using this data packet (Asyn) 700. Similarly to that shown in FIG. 9, the data packet (Asyn) 700 is transferred following after the token packet (Asyn) 1400.

Similarly to that shown in FIG. 10, this token packet (Asyn) 1400 travels around the ring-shaped bus 12 and returns to the master station 11a. The master station 11a operates as stated above to discard and delete the returned token packet (Asyn) 1400 and recognizes that a data packet (Asyn) 700 will be transferred to itself. The master station 11a receives and holds the transmitted data packet (Asyn) 700 and moves to step S307.

Since the master station 11a closes its own bus switch portion 240a after deleting the first token packet (Asyn) 1400, the data packet (Asyn) 700 travels around the ring-shaped bus 12 and comes back to the slave station 11b, like that shown in FIG. 11. The slave station 11b discards and deletes the returned data packet (Asyn) 700.

The master station 11a determines whether the status information obtained by analyzing the data packet (Asyn) 700 received in Step S306 is information showing completion of Isochronous data transmission (Step S307) or is a novel request for bandwidth from a slave station (Step S308). As the status information is a request for bandwidth from the slave station 11b at present, the master station 11a moves to Step S309 to determine whether it is possible to assign the band requested by the station 11b on the basis of the Isochronous data transmission rate included in the status information (Step S309). If it determines that the requested band can be assigned, it assigns the requested band to the slave station 11b (Step S310). In Step S310, the CPU portion 21a includes, in another storage region, a table format similar to the token packet (Iso) management table 1502 currently held in the token table management portion 233a, and it produces a new token packet (Iso) management table 1503 as shown in FIG. 17. More specifically, for example, as shown in FIG. 17, the CPU portion 21a sets (#2, #3) as the communication management information corresponding to the token (Iso) numbers "1", "3", and "n–1" for the token packet (Iso) management table 1503 on the basis of the source and destination station actual ID information and the transmission rate obtained from the status information transmitted from the slave station 11b to assign the bandwidth requested by the slave station 11b (Step S310), and then it moves to Step S311. In this embodiment, this token packet (Iso) management table 1503 is not used in Step S311 which is performed immediately after this Step S310. However, the token packet (Iso) management table 1503 may be used in Step S311 which is immediately after this Step S310.

Moving to Step S311, the master station 11a generates and sends out one token packet (Iso) 1500 on the basis of the communication management information corresponding to the token (Iso) number in the token packet (Iso) management table 1502 (FIG. 3; step S311). As only the communication management information (null, null) is set in the token packet (Iso) management table 1502 immediately after entering the steady mode, "null" and "null" are stored in the source and destination ID information fields 601 and 602 in the token packet (Iso) 1500. A token packet (Iso) containing "null" and "null" as source and destination ID information is referred to as a null token hereinafter. Having generated a null token, the master station 11a then opens the currently closed bus switch portion 240a and sends it out onto the ring-shaped bus 12. The null token is transferred when the certain time Ta has passed after transmission of the token packet (Asyn).

This null token travels around the ring-shaped bus 12 and returns to the master station 11a without being received at any slave stations 11. The master station 11a discards and deletes the returned token packet (Asyn) 1400, closes its own bus switch portion 240a and moves to Step S312.

In Step S312, the master station 11a generates and sends out one token packet (Iso) 1500 on the basis of the communication management information corresponding to the next token (Iso) number (the next one after the token (Iso) number referred to last time) in the token packet (Iso) management table 1502 (FIG. 3; Step S312). At present, the token packet (Iso) 1500 is also a null token, which travels around the ring-shaped bus 12 and returns to the master station 11a without being received at any slave stations 11. The master station 11a discards and deletes the returned null token, closes its own bus switch portion 240a, and ends Step S312.

Subsequently, the master station 11a repeats the operations in Steps S311 and 312 until it refers to the last token (Iso) number, or the token (Iso) number "n" (refer to the arrows in FIG. 15) in the taken packet (Iso) management table 1502 (FIG. 3; Steps S313–S31n).

The master station 11a discards and deletes the null token sent in Step S31n and then returns to Step S306. The master station 11a generates and sends out one, second token packet (Asyn) 1400 on the basis of the communication management information corresponding to the next token (Asyn) number that follows the one referred to in the last Step S306 in the token packet (Asyn) management table 1501 (FIG. 3; Step S306). This time, the token packet (Asyn) 1400 is generated according to the communication management information corresponding to the token packet (Asyn) number "2". Therefore, with this token packet (Asyn) 1400, the slave station 11c is authorized to transmit a data packet (Asyn) 700 to the master station 11a.

Since the communication of the data packet (Asyn) based on this token packet (Asyn) 700 and operation of the master station 11a which has received the Asynchronous data (FIG. 3; Steps S307–S309) are the same as those described above, they are not described, and Step S310 is described next.

Figure 18:
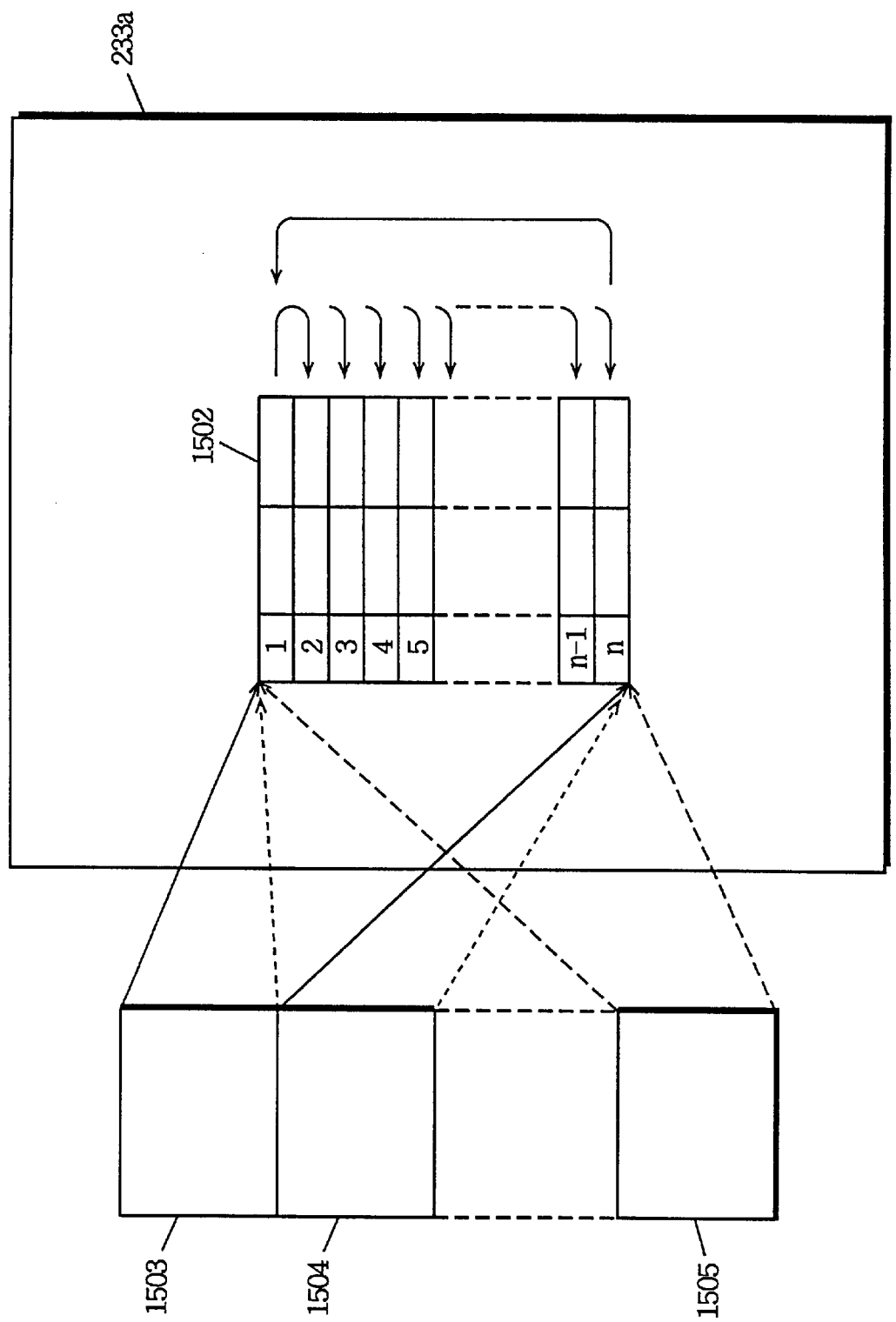
FIG. 18 is a diagram showing the concept of rewrite of the token packet (Iso) management table.

Similarly to the operation explained above, on the basis of the status information of the slave station 11c collected with this token packet (Asyn) 700, the CPU portion 21a assigns a bandwidth corresponding to the request (Step S310). It includes, in the above-stated another storage region, a table format similar to the token packet (Iso) management table 1502, and it creates a new token packet (Iso) management table 1504, as shown in FIG. 18. Furthermore, in Step S310, the CPU 21a updates the token packet (Iso) management table 1502 currently stored in the token table management portion 233a to the new token packet (Iso) management table 1503 created as explained above and stored in the other storage region. Then, as shown in FIG. 15, while only the communication management information ("null", "null") were first set in the token table management portion 233a, ("#2", "#3") are set in the communication management information corresponding to the token (Iso) numbers "1", "3", "n−1" and the like. Thus, the CPU portion 21a sequentially updates the token packet (Iso) management table referred to last time to one which is referred to this time in Step S310 in FIG. 3 to rewrite the token packet (Iso) management table. FIG. 18 is a diagram exemplifies the idea of rewriting the token packet (Iso) management table 1502. In FIG. 18, the token packet (Iso) management table 1502 which is referred to first is held in the token table management portion 233a of the master station 11a, and the token packet (Iso) management tables 1503–1505 which are referred to the next time and later are held in the aforementioned another storage region. Having sent out the token packets (Iso) referring to all token (Iso) numbers in the token packet (Iso) management table 1502, the master station 11a then updates it to the token packet (Iso) management table 1503 which is to be referred to when sending out the next token packets (Iso). Updating the tables in the master station 11a enables size reduction of the token packet (Iso) management table actually provided in the token table management portion 233. After the CPU 21a has finished updating to the token packet (Iso) management table 1503, the master station 11a moves to Step S311.

In Step S311, the master station 11a generates and sends out one token packet (Iso) 1500 on the basis of the communication management information corresponding to a token (Iso) number in the updated token packet (Iso) management table 1502 (1503) (FIG. 3; Step S311). As is clearly seen by referring to FIG. 15, "#2" and "#3" are stored in the source and destination actual ID information fields 601 and 602 (refer to FIG. 6), with which the master station 11a authorizes the slave station 11b to transmit Isochronous data to the salve station 11c.

Figure 19:
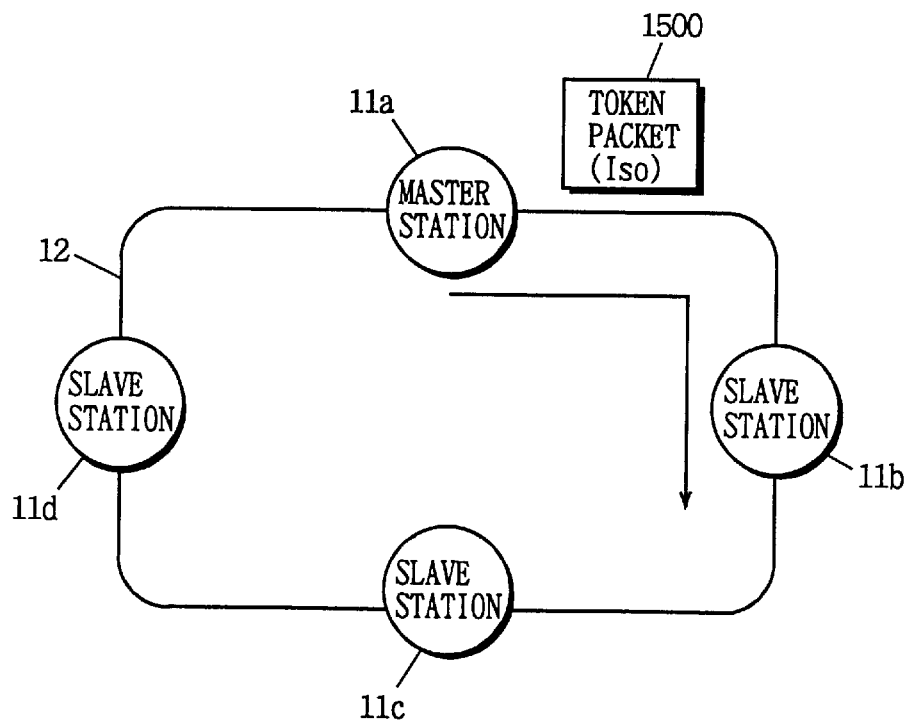
FIG. 19–FIG. 24 are diagrams illustrating the flow of the token packet (Iso) 1500, the DS packet 1800 or the data packet (Iso) 1900 in the communication network shown in FIG. 1.
Figure 20:
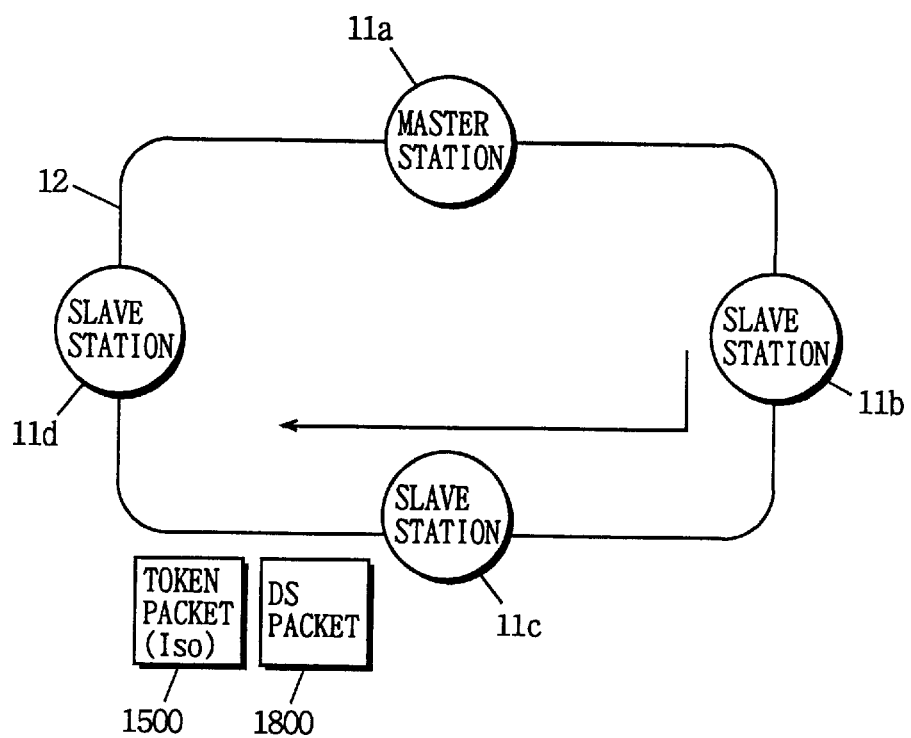

This token packet (Iso) 1500 passes the slave station 11b while traveling on the ring-shaped bus 12 (Refer to the arrow in FIG. 19). At this time, the slave station 11b operates as described above to recognize that it was authorized to transmit Isochronous data, and waits for DS packet 1800 containing receiving operation mode information to be transferred from a station serving as a destination of the Isochronous data. At this time, since the bus switch portion 240b is kept closed, the token packet (Iso) 1500 is transferred toward downstream stations 11c, passing the slave station 11c (refer to the arrow in FIG. 20). Then, the slave station 11c operates as explained above to generate receiving station operation mode information and sends out DS packet 1800 when a certain time has passed after reception of the token packet (Iso) 1500. At this time, the transmission/reception control circuit 236c of the slave station 11c opens the bus switch portion 240c when sending out the DS packet 1800, so that the DS packet 1800 is transferred following after the token packet (Iso) 1500, as shown in FIG. 20.

Figure 21:
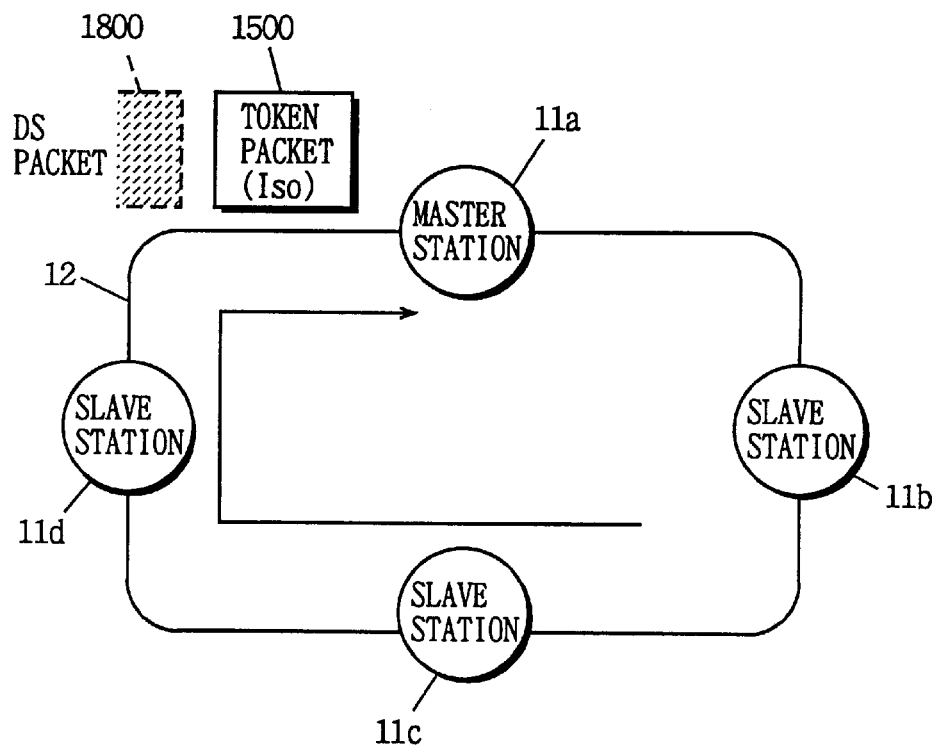
Figure 22:
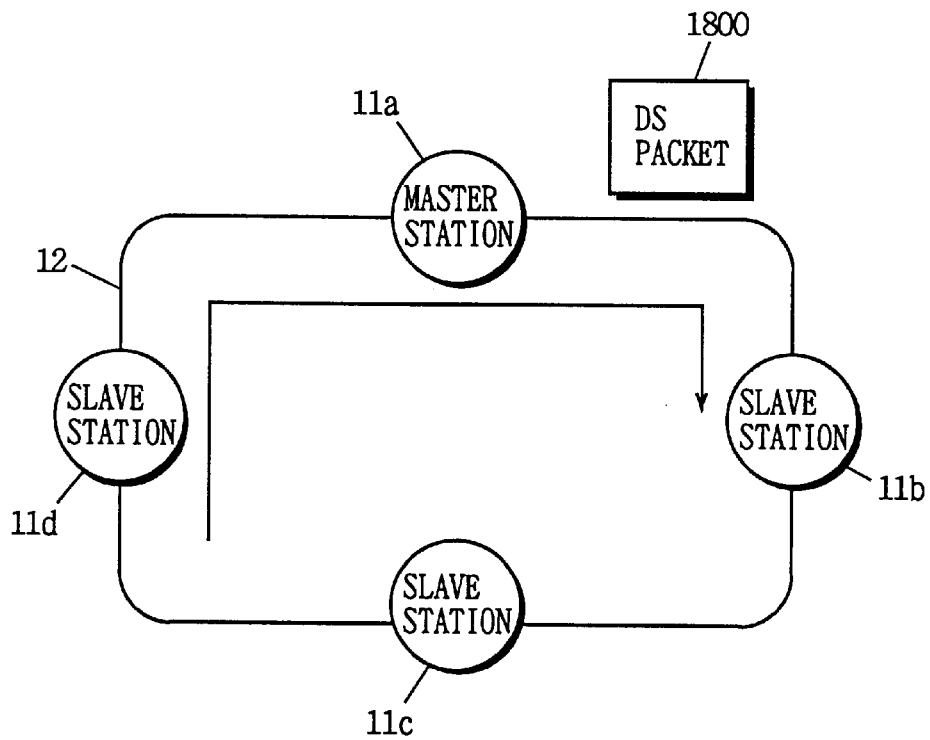

As shown in FIG. 21, the token packet (Iso) 1500 travels around the ring-shaped bus 12 and returns to the master station 11a. The master station 11a operates as stated above to receive and recognize the returned token packet (Iso) 1500 and then discards that token packet (Iso) 1500. When receiving and recognizing the token packet (Iso) 1500, the master station 11a closes the currently opened bus switch portion 240a. Accordingly, as shown in FIG. 22, the DS packet 1800 passes the master station 11a and the slave station 11b. The slave station 11b operates as stated above to receive and analyze the DS packet 1800, and then it can determine whether the slave station 11c is currently in a state capable of receiving the Isochronous data on the basis of the receiving station operation mode information stored in the receiving station operation mode information field 1801. As a result of the determination, the slave station 11b generates a data packet (Iso) 1900 only when the slave station 11c is in an Isochronous data receivable state, and sends it out when a certain time has passed after reception of the DS packet 1800. At this time, the transmission/reception control circuit 236b of the slave station 11b opens the bus switch portion 240b when sending the data packet (Iso) 1900, so that the data packet (Iso) 1900 is transmitted following after the DS packet 1800, as shown in FIG. 23.

Figure 23:
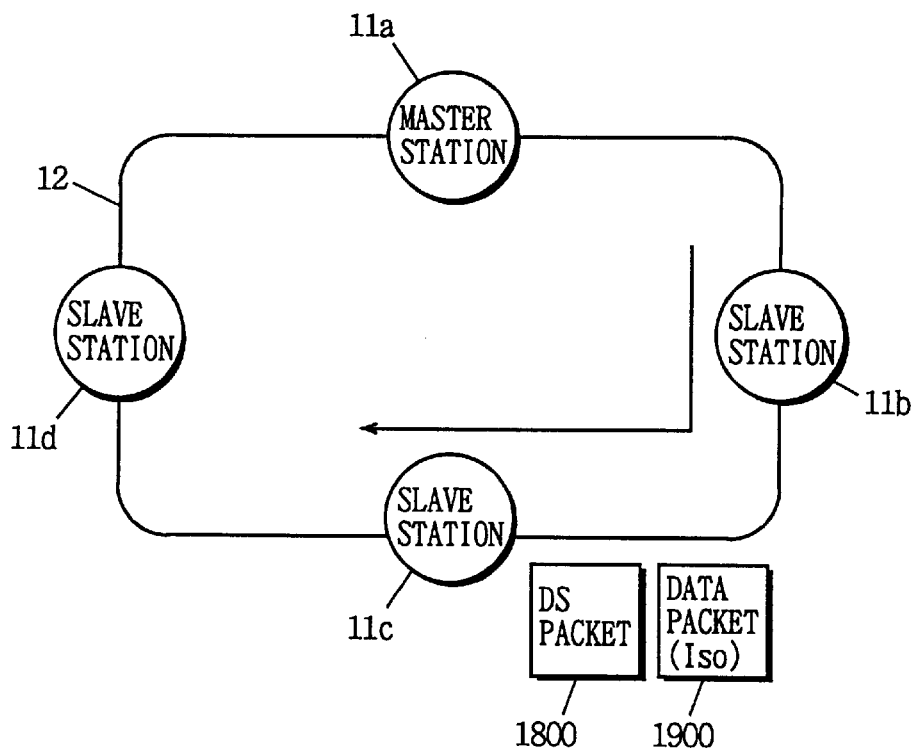

The DS packet 1800, as shown in FIG. 23, travels around the ring-shaped bus 12 and comes back to the slave station 11c. The slave station 11c operates as explained above to receive and recognize the returned DS packet 1800, and then discards it and closes the bus switch portion 240c which was open at the time of the reception. Furthermore, it receives the data packet (Iso) 1900 which follows that DS packet 1800. Thus the Isochronous data communication from the slave station 11b to the slave station 11c has been accomplished.

Figure 24:
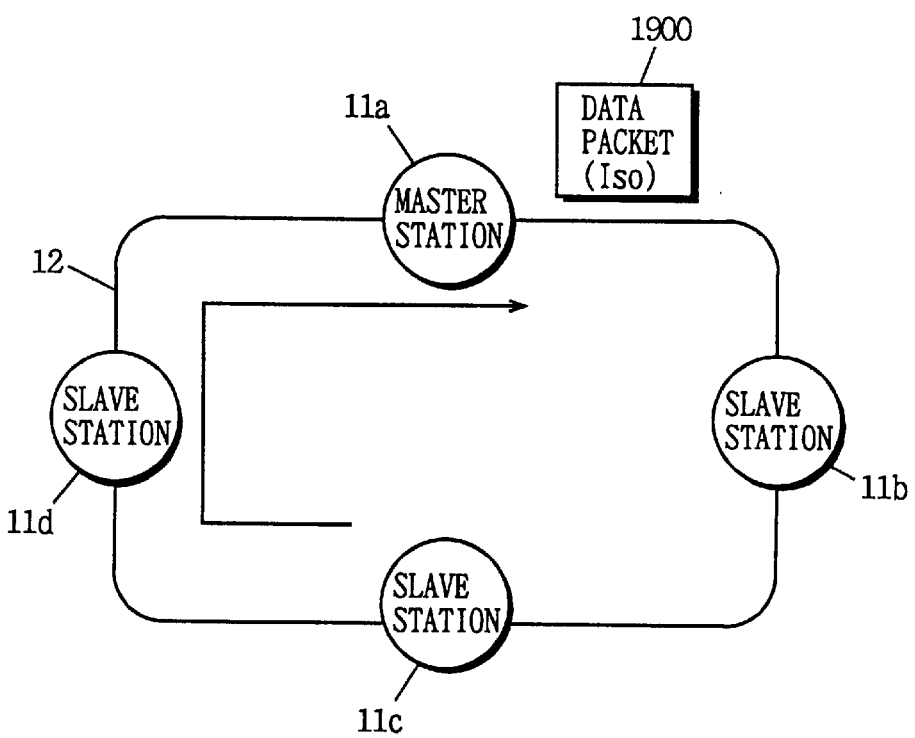

Since the bus switch portion 240c is closed, the data packet (Iso) 1900 travels around the ring-shaped bus 12 and comes back to the slave station 11b, as shown in FIG. 24. The slave station 11b then operates as explained above to receive and recognize the returned data packet (Iso) 1900. Then, it discards it and closes the bus switch portion 240b which was open at the time of the reception.

Moving to Step S312, the master station 11a produces one token packet (Iso) 1500 on the basis of the communication management information corresponding to the next token (Iso) number (the next token number after that referred to last time) in the updated token packet (Iso) management table 1502 (1503), and sends it out as shown in FIG. 19 (FIG. 3; Step S312). In the token packet (Iso) 1500 sent out this time, as is clearly seen by referring to FIG. 15, the token packet (Iso) 1500 sent out this time is a null token. The operation performed by the stations 11 with this is the same as that described above, and hence is not described again.

Subsequently, the master station 11a moves to Step S313 and causes a new token packet (Iso) 1500 to be outputted when the certain time Ta has passed after the transmission of the last token packet 1500. Accordingly, the Isochronous data communication (the communication of the DS packet 1800 and the data packet (Iso) 1900) is done within the aforementioned certain time Ta.

Subsequently, the master station 11a repeats the operation according to the flow chart in FIG. 3 to perform Isochronous data communication in this communication network.

When its own Isochronous data communication is finished, a slave station 11 can send out a data packet (Asyn) 700 including a communication completion notice as status information in response to the token packet (Asyn) 600 sent out in Step S306 in FIG. 3 to request deletion of the bandwidth already assigned. In this case, the master station 11a moves to Step S320 through Step S307 in FIG. 3. The master station 11a deletes the bandwidth which has already been assigned to the slave station 11 which sent out the communication completion notice from the token (Iso) management table 1502 currently held (step S320).

Figure 25:
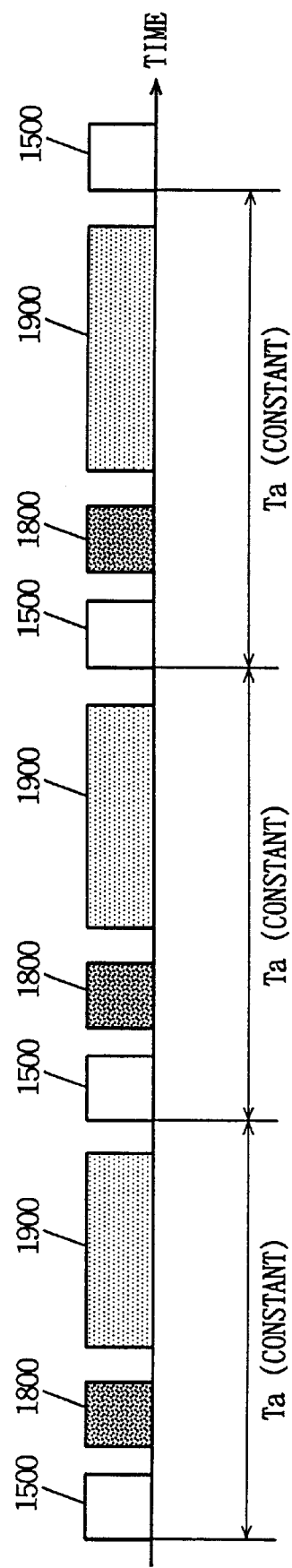
FIG. 25 is a diagram showing, on the time domain, the token packets (Iso) 1500, the DS packets 1800 and the data packets (Iso) 1900 transferred on the ring-shaped bus 12 of this network in case Step S311 in the flow chart shown in FIG. 3 is repeatedly performed.
Figure 26:
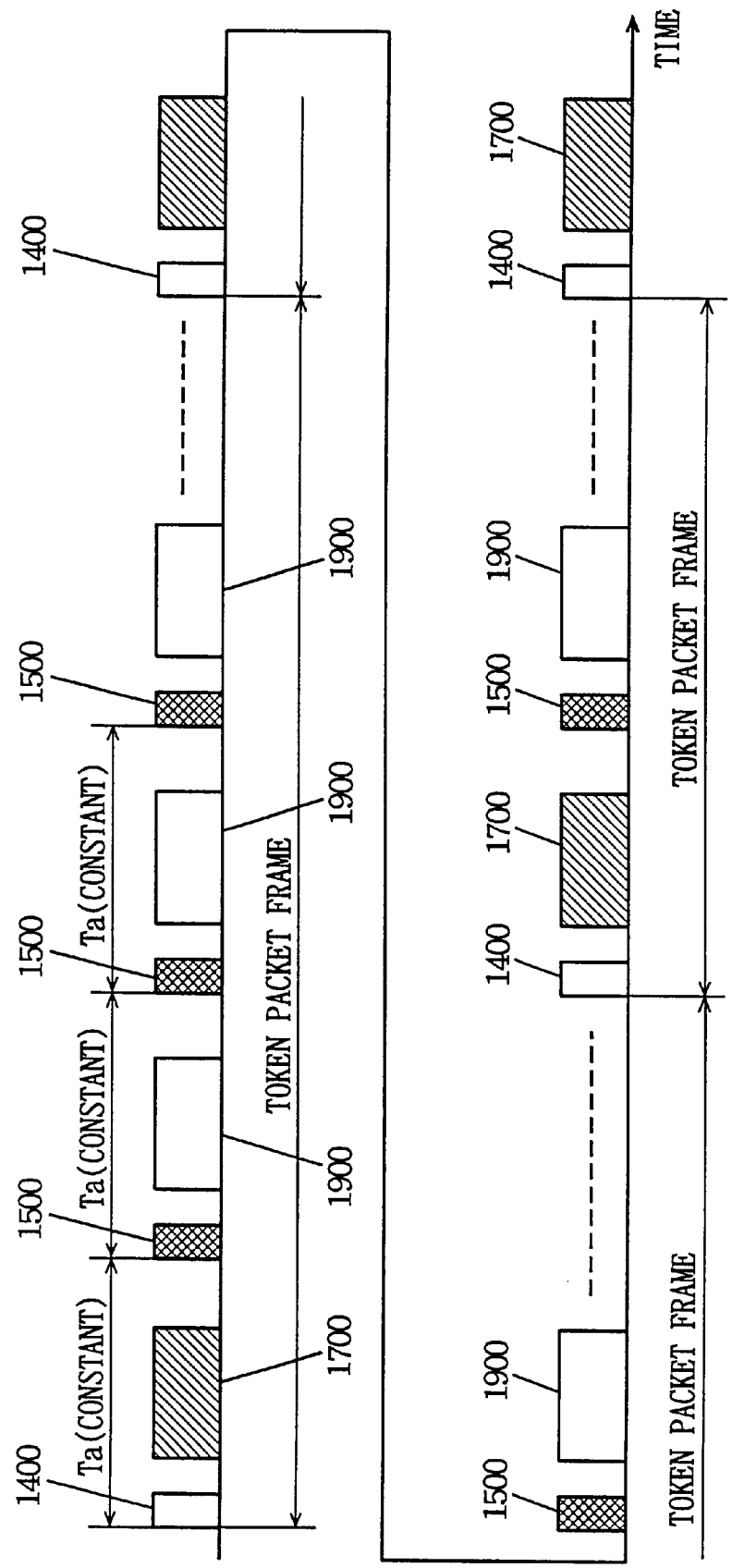
FIG. 26 is a diagram showing the structure of a token packet frame formed in the communication network shown in FIG. 1.

In the communication network according to this embodiment, as is clear from the description above, the token packets (Asyn or Iso) are constantly sent out by the master station 11a (refer to FIG. 1) for every constant times Ta (refer to FIG. 25). As shown in FIG. 26, at least one token packet (Asyn) and n token packets (Iso) form a token packet frame. Each token packet (Asyn or Iso) has a packet type information field 603 (refer to FIG. 6), which contains first or second packet type information. The master station 11a provides the Isochronous data transfer authorization or the Asynchronous data transfer authorization to a slave station 11 by using this packet type information.

When the master station 11a receives a transmission bandwidth request from a slave station 11 with a token packet (Asyn) and it can reserve the transmission bandwidth, it determines the number of transmissions of token packets (Iso) for providing Isochronous data transfer authorization and the number of transmissions of token packets (Asyn) for providing Asynchronous data transfer authorization in a token packet frame.

By thus forming a token packet frame, with token packets sent out at constant intervals and provided with the packet type information for identifying the type of transfer-authorized data, the master station 11a can easily assign the transmission bandwidth corresponding to a request from a slave station 11.

Furthermore, in this communication network, as described above, the master station 11a sets the number of transmissions of the token packets (Iso) larger than the number of transmissions corresponding to the bandwidth requested from a slave station 11 to such a degree so as not to affect the overall bandwidth of this communication network. That is, the master station 11a sets the least number of communication management information (null, null) in the token packet (Iso) management table 1502 (refer to FIG. 15). This allows use of a buffer memory having smaller capacity in the slave station 11 (corresponding to the Isochronous data FIFO portion 234 shown in FIG. 2).

That is to say, when the master station 11a transfers the token packets (Iso) for a larger number of times, the slave stations 11 are authorized to transfer the data packets (Iso) for a larger number of times. When the master station 11a thus gives bandwidth larger than that requested by the slave stations 11, the slave stations 11 transfer the data packets (Iso) one after another. This means that a smaller amount of Isochronous data is stored in the buffer memory (Isochronous data FIFO portion 234) of the salve stations 11. Accordingly, in this communication network, buffer memories with smaller capacity can be used in the salve stations 11.

Furthermore, in this communication network, the use of the DS packets allows a slave station 11 serving as a source of Isochronous data to confirm, before it sends out the Isochronous data, whether the buffer memory (the Isochronous data FIFO portion 234) in the Isochronous data destination station is in a state capable of receiving the Isochronous data. Then the source slave station can control transferring timing of the data packet (Iso) according to the state of the Isochronous data destination slave station.

In this embodiment, although the DS packets are used only in case of transferring the data packet (Iso), the DS packet can be used in case of transferring the data packet (Asyn). Thus, correct transmission of Asynchronous data can be realized since the source station can grasp the status of the buffer memory (the Asynchronous data FIFO portion 232) which the station, the source of Asynchronous data, has.

As is clearly seen from the description provided so far, in this communication network, a token packet (Asyn or Iso) sent out from the master station 11a is provided with a packet recognizing bit. Since a slave station 11 detects the packet recognizing bit from an input token packet (Asyn or Iso) when receiving, it can correctly recover the receiving timing for that packet. This communication network thus realizes correct data communication.

Figure 27:
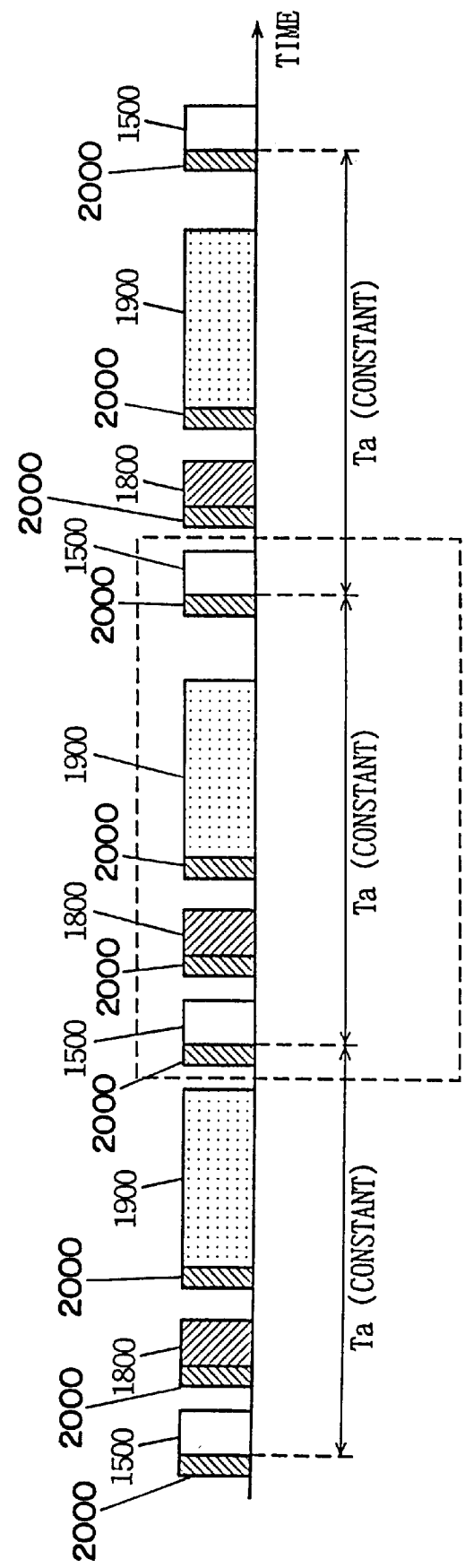
FIG. 27 is a diagram showing, on the time domain, the token packets (Iso) 1500, the DS packet 1800 and the data packets (Iso) 1900 transferred on the ring-shaped bus 12 of this network with the packet recognizing bits 2000 applied thereto.
Figure 28:
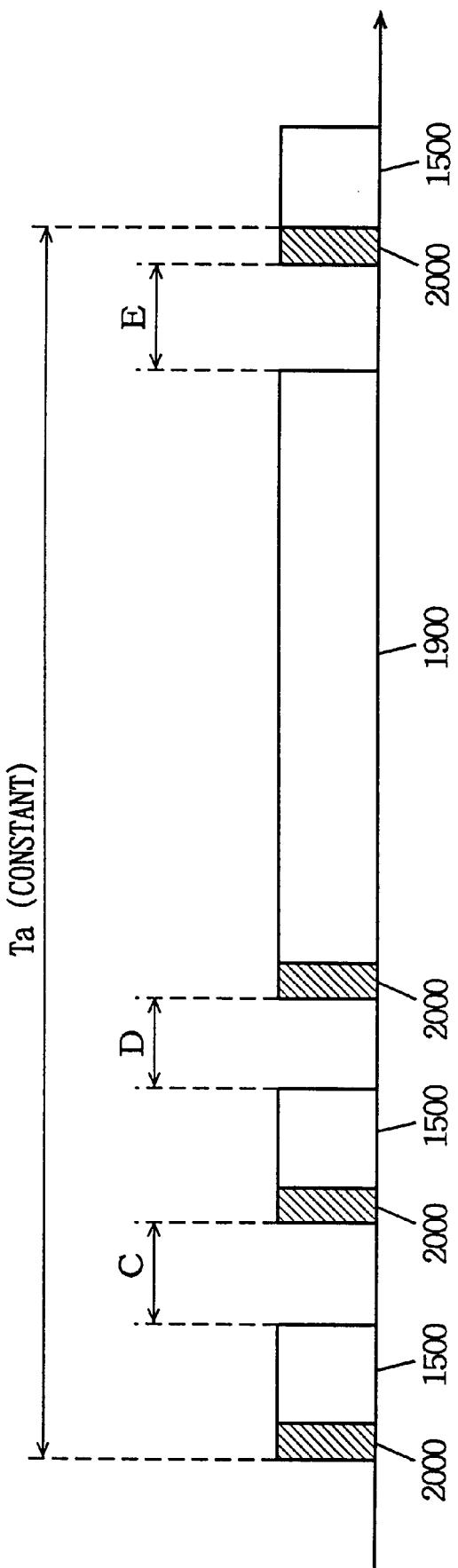
FIG. 28 is a diagram showing the part surrounded by the dotted line in FIG. 27 in detail.

FIG. 27 is a diagram showing, on the time domain, the token packets (Iso) 1500, the DS packets 1800 and the data packets (Iso) 1900 sent on the ring-shaped bus 12 in this communication network with the packet recognizing bits 2000 applied thereto. FIG. 28 shows the part surrounded by the dotted line in FIG. 27 in detail. In FIG. 27 and FIG. 28, the packet recognizing bits 2000 are provided in the transmitted packet recognizing bit adding circuit 239 shown in FIG. 2. The token packets (Iso) 1500, the DS packets 1800 and the data packets (Iso) 1900 provided with the packet recognizing bits 2000 are outputted onto the ring-shaped bus 12. In FIG. 28, the intervals between the packets (designated by C, D and E in FIG. 28) correspond to idle states (states fixed to one of 1 or 0) on the bus. The receiving packet recognizing bit identifying circuit 238 in each station 11 always monitors the ring-shaped bus 12 to detect the packet recognizing bit 2000 from the idle state to recover receiving timing for a received packet. Thus adding the packet recognizing bit 2000 to each packet enables more accurate recovery of the receiving timing.

Addition of such packet recognizing bits can be applied not only to such a ring-shaped communication network as explained in this embodiment but also to bus-type or daisy-chain type communication networks.

As is clear from the description, the token packets (Asyn or Iso) are sent out from the master station 11a at constant time intervals. Accordingly, the token packets (Asyn or Iso) also arrive at each slave station 11 at constant time intervals. Furthermore, the token packets (Asyn or Iso) arriving at the constant time intervals are provided with a PLL synchronization field storing PLL synchronization information. This PLL synchronization information is used for clock recovery. That is to say, the PLL portion 21 detects the synchronization information and uses it as a signal for a phase comparator of the PLL circuit. Accordingly, each slave station 11 can recover a system clock synchronized with the system clock of the master station 11a. This allows external equipment connected to the slave stations 11 to operate with the system clock of the slave stations synchronized with the system clock of the master station 11a.

Figure 29:
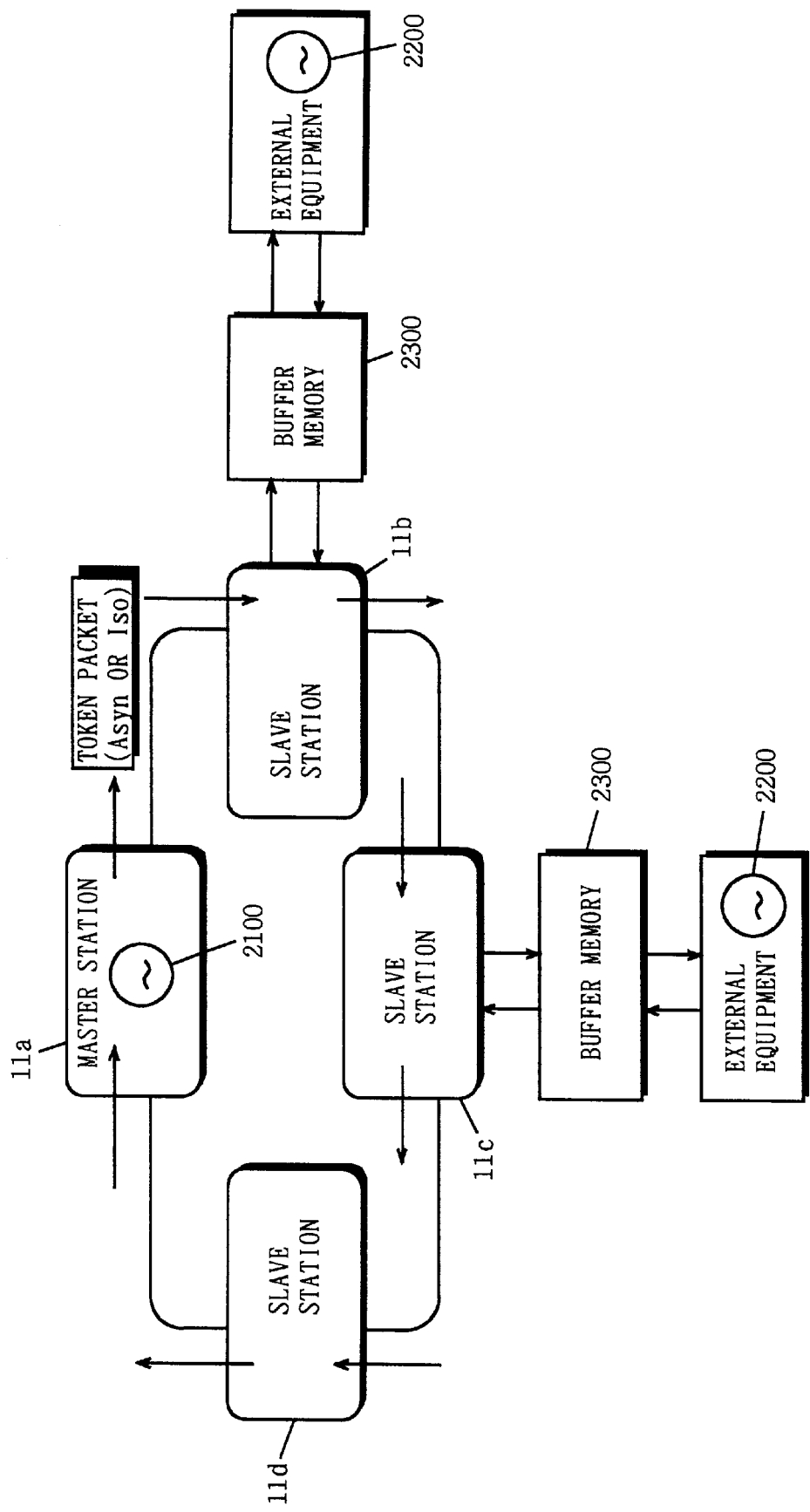

FIG. 29 shows an example in which external equipment of the stations operate with an asynchronous system clock 2200 independent of the system clock 2100 of the master station 11a. As shown in FIG. 29, data communication in which an external equipment of each station operates with such an asynchronous system clock requires a buffer memory 2300 between the station and the external equipment for absorbing a phase difference between the system clock for the master station 11a and the asynchronous system clock.

As stated above, however, this communication network eliminates the necessity of the buffer memory 2300 for absorbing phase difference since the external equipment of the stations 11 operate with the system clock for the master station 11a.

This way, in this communication network, sending the token packets including ID information of slave stations from the master station to reserve transmission bandwidth and sending the data packets including no ID information after the token packets enables communication of Isochronous data with highly real-time nature such as image and sound.

Furthermore, by forming a token packet frame with token packets sent out at constant intervals and provided with data identifiers for identifying the type of transmission-authorized data, the master station can easily assign the transmission bandwidth corresponding to requests from the slave stations.

The master station sets the number of transmissions of the token packets larger than a value determined from the requested transmission bandwidth to such a degree so as not to affect the overall band management, which provides the effect of allowing reduction of capacity of the buffer memories in the slave stations.

Furthermore, since DS packet is circulated after a token packet (Iso) traveling around the ring-shaped bus 12 and before a data packet (Iso) is sent out onto the bus, a source slave station 11 can control transmission of the data packet (Iso) according to the state of the Isochronous data destination slave station 11.

As is clearly seen from the description in the embodiment, the token packets (Iso) sent at the constant time intervals Ta are generated according to the token (Iso) numbers ("1"–"n" in the embodiment) to allow slave stations 11 transmitting Isochronous data to use the bandwidth. This means that the bandwidth of the bus is sectioned into certain bandwidths and authorization for the use is provided to slave stations 11 in the sectioned bandwidth units. Let the effective total data transmission rate in this communication network be X [Mbps], for example. n pieces of communication management information are held in the token packet (Iso) management table 1502. Accordingly, the master station 11a can reserve X/n [Mbps] bandwidth by reserving one piece of communication management information for a slave station 11.

As described in the embodiment, the master station 11a manages the effective total bandwidth of the bus previously partitioned into certain bandwidths by using the token packet (Iso) management table 1502, and rewrites contents of that table 1502 according to the bandwidth required in Isochronous data communication between stations 11. Then the master station 11a can easily manage the token packets and control (assign) the bandwidth by sending the token packets (Iso) at every constant time intervals Ta according to the contents in the token packet (Iso) management table 1502.

Furthermore, as explained above, the master station 11a holds a plurality of token (Iso) management tables 1503–1505 in another storage region stated above. Now, suppose that the master station 11a includes m token (Iso) management tables in total and the effective total data transmission rate in this communication network is X [Mbps]. In this case, although a token (Iso) management table can hold only n pieces of communication management information, the master station 11a can substantially rewrite the m (m is an integer of 1 or larger) token (Iso) management tables in the token table management portion 233a. Hence, the master station 11a virtually includes (n×m) pieces of communication management information. Then the master station 11a can reserve X/(n×m) [Mbps] bandwidth by reserving one piece of communication management information in the token (Iso) management table.

As has been described in the embodiment, the master station 11a manages the effective total bandwidth of the bus previously partitioned into certain bandwidths by using the token packet (Iso) management table 1502. After having referring to one token (Iso) management table, it dynamically rewrites it into contents in a token (Iso) management table held in another storage region. Therefore, it can manage and control the transmission band more detailedly than the size of the installed token (Iso) management table allows.

Figure 30:
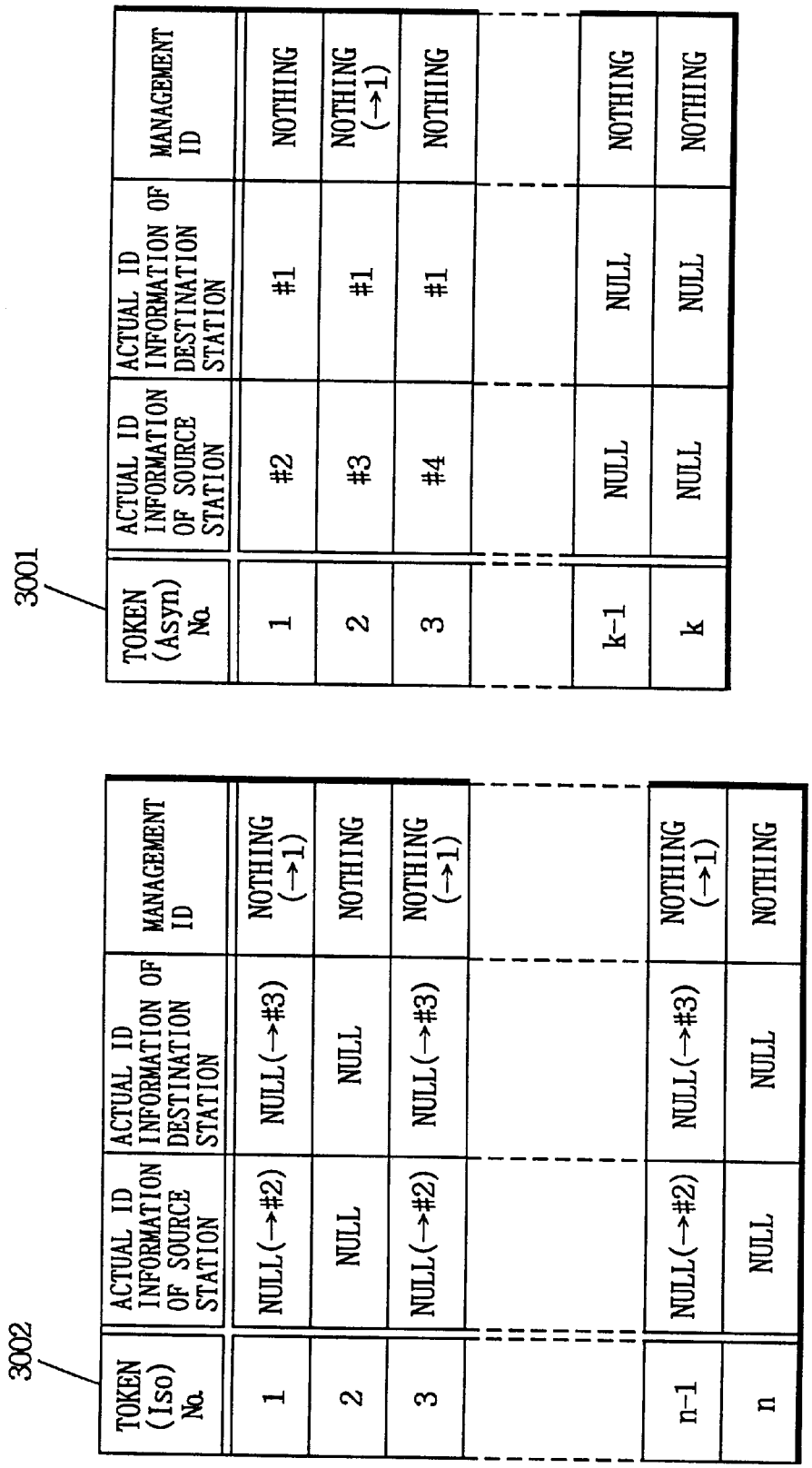
FIG. 30 is a diagram showing another implementation of the token packet (Asyn) management table and the token packet (Iso) management table stored in the token table management portion 233 of the master station 11a shown in FIG. 1.
Figure 31B:
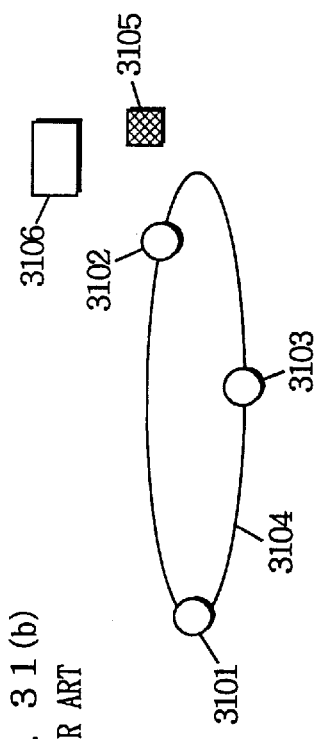
FIG. 31 is a diagram illustrating the structure of a LAN adopting the token passing bus and data communication in the LAN.
Figure 31D:
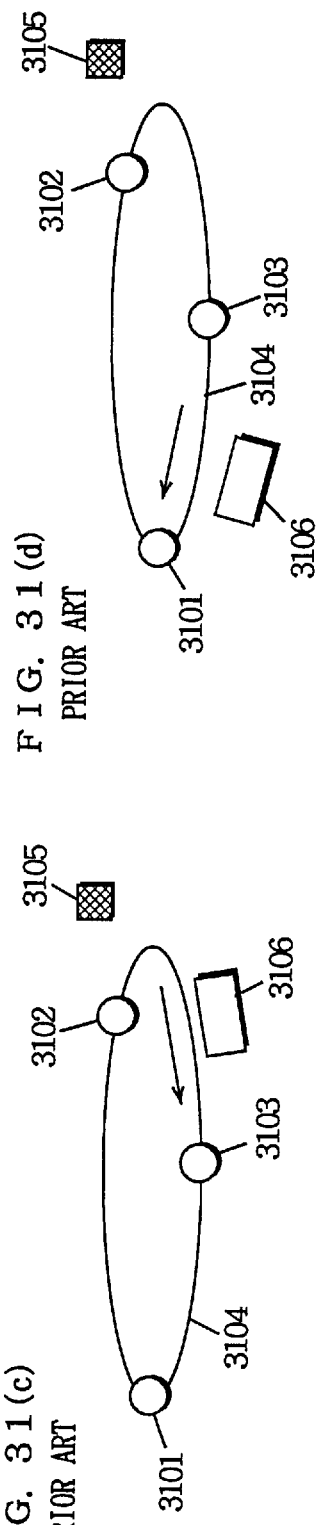
Figure 31F:
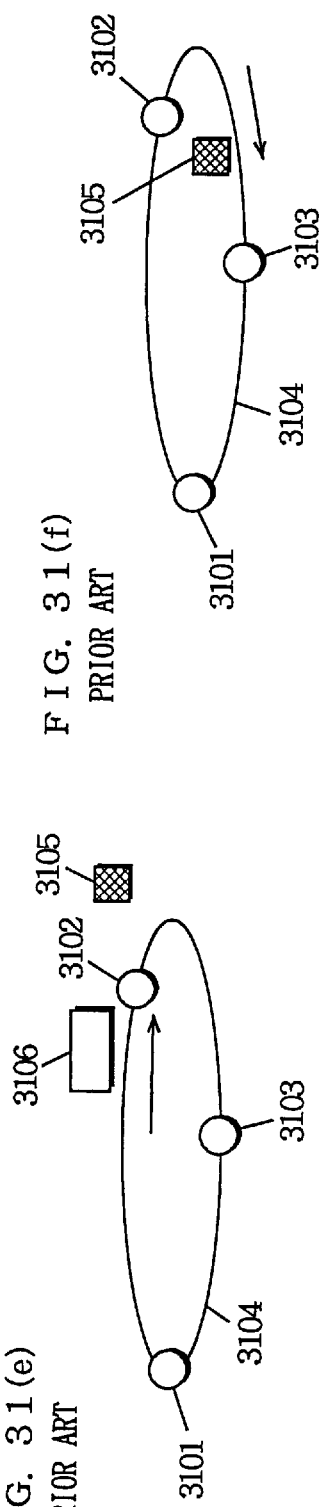
Figure 31A:
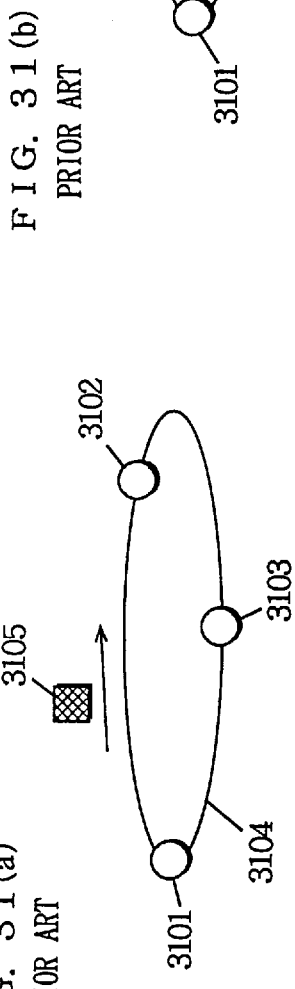
Figure 31C:
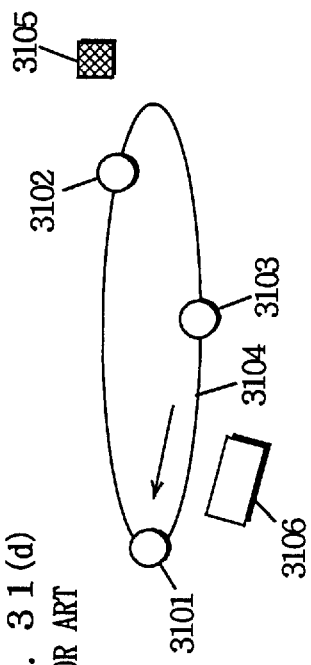
Figure 31E:
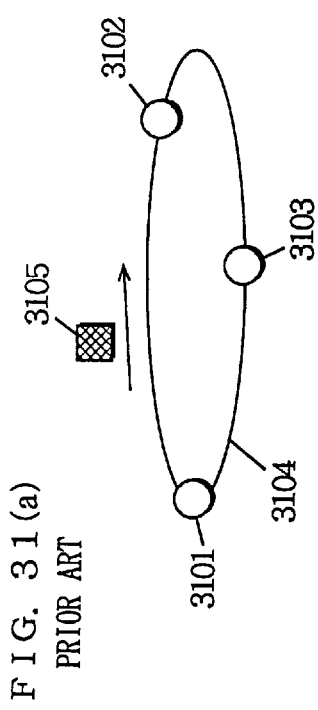
Figure 33:
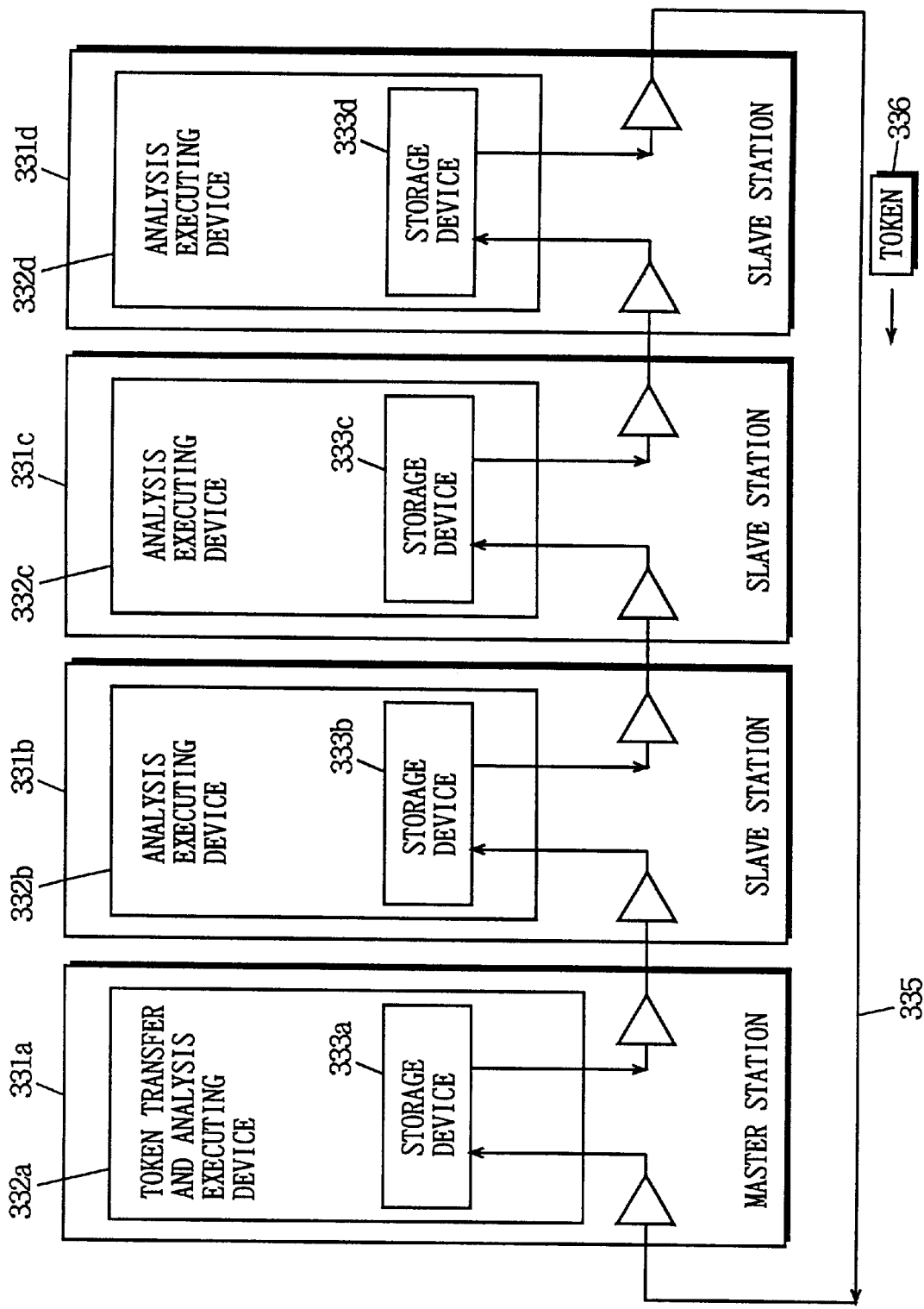
FIG. 33 is a diagram illustrating analysis of the token 336 in each station connected to the Master Slave Network.

In the embodiment above, the token table management portion 233 holds the token packet (Asyn and Iso) management tables 1501 and 1502 shown in FIG. 15. Instead, it may hold token packet (Asyn and Iso) management tables 3001 and 3002 described below (refer to FIG. 30). In FIG. 30, the token packet (Asyn) management table 3001 holds k (k is an integer of 1 or larger) pieces of communication management information (described above) and management IDs for individual token (Asyn) numbers and the token packet (Iso) management table 3002 holds n (n is an integer of 1 or larger) pieces of communication management information (described above) and management IDs for the individual token (Iso) numbers.

In FIG. 30, for a more definite description, when the token packet (Asyn) management table 3001 is produced, communication management information (#2, #1, nothing), (#3, #1, nothing) and (#4, #1, nothing) are set as the communication management information (source station actual ID information, destination station actual ID information, management ID) for the token (Asyn) numbers 1, 2, and 3, and (null, null, nothing) are set for the following token (Asyn) numbers 4-k. The management ID (Asyn) is updated as needed. As shown in FIG. 30, for example, that for the token (Asyn) number "2" is updated from "nothing" to "1." In the token packet (Iso) management table 3002, like that explained above, the communication management information (source station actual ID information, destination station actual ID information, management ID) of (null, null, nothing) are set for the token (Iso) numbers 1–n at the time when entering the steady mode. The token packet (Iso) management table 3002 is dynamically updated as the master station 11a collects statuses from the slave stations 11 and assigns transmission bandwidths. As shown in FIG. 30, for example, the communication management information for the token (Iso) numbers 1, 3, and (n–1) are updated from (null, null, noting) to (#2, #3, 1).

The token packet (Asyn and Iso) management tables 3001 and 3002 having the aforementioned structures are used as described below in the Asynchronous and Isochronous data communication in this communication network.

Similarly to the embodiment above, the master station 11a (refer to FIG. 1) first obtains status of each slave station (refer to FIG. 1) by Asynchronous data communication. Now, suppose that the master station 11a sends out a token packet (Asyn) by referring to the contents for the token (Asyn) number "2" in the token packet (Asyn) management table 3001. The slave station 11c sends out a data packet (Asyn) for requesting Isochronous data communication according to this token packet (Asyn). The master station 11a produces the token packet (Iso) management table 3002 on the basis of this data packet (Asyn). At this time, for example, in the token packet (Iso) management table 3002, it rewrites the communication management information corresponding to the token (Iso) numbers "1", "3" and "n–1" from (null, null) to (#2, #3) to reserve the bandwidth for the slave station 11c. The master station 11a, at the same time, sets an ID value ("1", for example) for the management IDs corresponding to the token (Asyn) number "2" and the token (Iso) numbers "1", "3", and "n–1".

When the master station 11a recognizes that the slave station 11 requests deletion of the already reserved bandwidth by obtaining the status, it clears the management ID corresponding to that slave station 11 in the token packet (Asyn) management table 3001, retrieves that management ID (ID value) from the token packet (Iso) management table 3002 and clears the corresponding communication management information.

Thus, the master station 11a manages the token packet (Iso) management table 3002 and the token packet (Asyn) management table 3001 as a pair by using the management IDs, and therefore it can easily manage and control the bandwidth in the communication network and can establish a virtual link of slave stations performing Isochronous data communication.

In the embodiment, the token table management portion 233a holds the token (Asyn and Iso) management tables 1501 and 1502. However, this communication network can perform Isochronous data communication even with only the token packet (Iso) management table 1502 held in the token table management portion 233a.

While the invention has been described in detail, the foregoing description is in all aspects illustrative and not restrictive. It is understood that numerous other modifications and variations can be devised without departing from the scope of the invention.

We claim:

1. A communication network comprising:
a plurality of stations connected to communicate with each other via a bus, wherein one of said plurality of stations is a master station and the remaining plurality of stations are a plurality of slave stations;
wherein said plurality of stations are provided with ID information for specifying each station on the bus;
wherein said master station is adapted to send out a token packet through the bus which includes ID information designating at least one of said plurality of stations as being a transmitter of data and designating at least one of said plurality of stations as being a destination of the data;
wherein the token packet is transmitted through the bus without being changed by any of said plurality of slave stations, and is received by each of said plurality of stations;
each of said plurality of stations is adapted to:
analyze the ID information contained in the token packet received from the bus;
send out a data packet through the bus when designated by the ID information as being the transmitter of data; and
receive the data packet being sent through the bus when designated by the ID information as being the destination of the data; and
wherein the data packet is not provided with the ID information designating at least one of said plurality of stations as being the transmitter of data and designating at least one of said plurality of stations as being the destination of the data.

2. A communication network as claimed in claim 1, wherein:
said master station comprises:
a token transfer portion for generating and sending out the token packet on the bus;
an analysis executing portion for analyzing the token packet received from the bus, and sending out the data packet when designated by the ID information in the token packet as being the transmitter of data or receiving the data packet when designated by the ID information in the token packet as being the destination of data; and
a switch portion of said master station for disconnecting a downstream side of the bus from an upstream side of the bus and then connecting the downstream side of the bus to said token transfer portion and said analysis executing portion, or disconnecting the downstream side of the bus from said token transfer portion and said analysis executing portion and then connecting the downstream side of the bus to the upstream side of the bus;
each of said plurality of slave stations comprises:
an analysis executing portion for analyzing the token packet received through the bus, and sending out the data packet when designated by the ID information in the token packet as being the transmitter of data or receiving the data packet when designated by the ID information in the token packet as being the destination of data; and
a switch portion of said slave station for disconnecting a downstream side of the bus from an upstream side of the bus and then connecting the downstream side of the bus to said analysis executing portion, or disconnecting the downstream side of the bus from said analysis executing portion and then connecting the downstream side of the bus to the upstream side of the bus.

3. A communication network as claimed in claim 2, wherein:
each of said plurality of slave stations comprises a register;

said switch portion of said master station disconnects the downstream side of the bus from the upstream side of the bus, and then connects the downstream side of the bus to said token transfer portion and said analysis executing portion at initialization;

said switching portion of each of said plurality of slave stations disconnects the downstream side of the bus from the upstream side of the bus, and then connects the downstream side of the bus to said analysis executing portion at initialization;

said master station sends out an ID information setting command including dummy ID information from said token transfer portion to each of said plurality slave stations starting with a first one of said plurality of slave stations which is located downstream and closest to said master station;

in each of said plurality of slave stations:

said analysis executing portion receives and analyzes the ID information setting command when said switch portion disconnects the downstream side of the bus from the upstream side of the bus, and then connects the downstream side of the bus to said analysis executing portion, so that the dummy ID information in the ID information setting command is stored in said register; and said switch portion disconnecting the downstream side of the bus from said analysis executing portion and then connecting the downstream side of the bus to the upstream side of the bus after the dummy ID information is stored in said register;

wherein when the ID information setting command, after being sent out from said master stations and being passed downstream to said plurality of slave stations, is not received by said master station, said master station changes the dummy ID information and sequentially sends out the ID information setting command so that such a plurality of changed dummy ID information is stored into said register of each of said plurality of slave stations, respectively.

4. A communication network as claimed in claim 3, wherein said master station, when said analysis executing portion of said master station receives the ID information setting command sent out from said master station, stops sending out the ID information setting command, and then said plurality of stations perform data communication using the different dummy ID information.

5. A communication network as claimed in claim 4, wherein:

each of said plurality of slave stations retains predetermined actual ID information;

said master station collects the actual ID information on each of said plurality of slave stations through the data communication being performed with each of said plurality of slave stations using the dummy ID information, confirms if the actual ID information on each of said plurality of slave stations are overlapping and, if not, writes the actual ID information into said register portion in the respective one of said plurality of slave stations; and each of said plurality of slave stations perform the data communication with the actual ID information or the dummy ID information being stored in said register of each of said plurality of slave stations.

6. A communication network as claimed in claim 4, wherein said master stations learns a number of said plurality of slave stations which are connected to the bus from a number of ID information setting commands sent out.

7. A communication network as claimed in claim 2, wherein in said master station:

said switch portion disconnects the downstream side of the bus from the upstream side of the bus, and connects the downstream side of the bus to said token transfer portion;

said token transfer portion sends out the token packet onto the bus;

said analysis executing portion discards the sent token packet after receiving the token packet from the bus; and said switch portion disconnects the downstream side of the bus from said token transfer portion and then connects the downstream side of the bus to the upstream side of the bus after receiving the token packet.

8. A communication network as claimed in claim 2, wherein in each of said plurality of stations:

said switch portion disconnects the downstream side of the bus from the upstream side of the bus, and then connects the downstream side of the bus to said analysis executing portion;

said analysis executing portion sends out the data packet to the bus, and discards the data packet after receipt of the data packet from the bus; and said switch portion disconnects the downstream side of the bus from said analysis executing portion, and then connects the downstream side of the bus to the upstream side of the bus after receipt of the data packet from the bus.

9. A communication network as claimed in claim 1, wherein the token packet comprises a plurality of ID information on at least one of said plurality of stations as a destination of data.

10. A communication network as claimed in claim 1, wherein each of said plurality of slave stations further comprise a token transfer portion for generating and sending out the token packet.

11. A communication network as claimed in claim 1, wherein said master station sends out the token packet according to a transmission request from each of said plurality of stations.

12. A communication network as claimed in claim 1, wherein said master station sends out the token packet at constant time intervals.

13. A communication network as claimed in claim 1, wherein the at least one plurality of stations, as a transmitter of data, sends out a plurality of data including each different characteristics, and said master station sends out the token packet further to comprise an identifier set to specify each type of data.

14. A communication network as claimed in claim 11, wherein said master station sets an actual transmission frequency of the token packet larger than a transmission frequency determined on a basis of a transmission bandwidth request.

15. A communication network as claimed in claim 1, wherein the data to be sent out comprises Isochronous data required to be isochronous and Asynchronous data not required to be isochronous, and wherein in said master station:

the token packet is provided with an identifier to specify the Isochronous data or the Asynchronous data, is sent out from said master station as a transmitter, and is sent out at constant time intervals; and a unit of token packet frame comprises a predetermined number of the token packets to be sent out, and is repeatedly sent out.

16. A communication network as claimed in claim 15, wherein said master station further comprises a first token management table to which the ID information on each of the plurality of stations can be written; and said master station sequentially sends out the token packet according to the ID information of each of the plurality of stations written into said first token management table when sending out the token packet within the token packet frame to perform Isochronous data communication.

17. A communication network as claimed in claim 16, wherein said master station further comprises a second token management table to which the ID information on each of said plurality of stations can be written; and said master station sequentially sends out the token packet according to the ID information of each of said plurality of stations written into said second token management table when sending out the token packet within the token packet frame to perform Asynchronous data communication.

18. A communication network as claimed in claim 17, wherein said master station dynamically rewrites the ID information on each of said plurality of stations included in said first token management table and the ID information on each of said plurality of stations included in said second token management table.

19. A communication network as claimed in claim 18, wherein said master station:

obtains and analyses, through the Asynchronous data communication, information relevant to bandwidth used for the Isochronous data communication requested by each of said plurality of stations;

writes the ID information into said first token management table for each of said plurality of stations in order to reserve the bandwidth for the Isochronous data communication; and deletes the ID information from said first token management table for each of said plurality of stations in order to release the bandwidth for the Isochronous data communication.

20. A communication network as claimed in claim 19, wherein said first token management table and said second token management table are respectively provided with identification information to correspond to each other, and the identification information is allowed to be written thereto;

said master station:
writes the ID information on the station and the identification information into said first token management table in order to reserve the bandwidth requested by each of said plurality of stations for the Isochronous data communication, and writes the same identification information into said second token management table corresponding to the Asynchronous data communication having been requested for the bandwidth for the Isochronous data communication; and deletes the ID information on the station from said first token management table in order to release the bandwidth requested by each of said plurality of stations for the Isochronous data communication according to the identification information being included in said second token management table corresponding to the Asynchronous data communication having been requested to release the bandwidth for the Isochronous data communication.

21. A communication network as claimed in claim 1, wherein each of said plurality of stations sends out a destination status packet in between the token packet and the data packet when designated as a destination of the data, wherein the destination status packet indicates if the data packet sent out from at least one of said plurality of stations designated as being a transmitter can be received.

22. A communication network as claimed in claim 1, wherein:

said master station further comprises a clock oscillator for generating a clock having a prescribed frequency;

each of said plurality of stations further comprise a PLL portion; and the token packet is provided with synchronization information for enabling the clock having the prescribed frequency to be recovered in said PLL portion on each of said plurality of stations side.

23. A communication network as claimed in claim 1, wherein each of said plurality of stations adds a packet recognizing bit to the token packet or the data packet, wherein the packet recognizing bit enables receiving timing in the token packet or the data packet to be recovered on a destination side of the token packet or the data packet.

24. A communication network as claimed in claim 23, wherein each of said plurality of stations recovers the receiving timing in the token packet or the data packet according to the packet recognizing bit provided to the token packet or the data packet.

25. A communication network as claimed in claim 23, wherein each of said plurality of stations comprise:

a transmitted packet assembling circuit for assembling the token packet or the data packet;

a packet recognizing bit adding circuit for adding the packet recognizing bit to the token packet or the data packet assembled by said transmitted packet assembling circuit;

a switch portion for disconnecting a downstream side of the bus from an upstream side of the bus, and then connecting the downstream side of the bus to said packet recognizing bit adding circuit, or disconnecting the downstream side of the bus from said packet recognizing bit adding circuit, and then connecting the downstream side of the bus to the upstream side of the bus; and a transmission control circuit for controlling said transmitted packet assembling circuit, said packet recognizing bit adding circuit, and said switch portion;

said transmission control circuit controls said switch portion to connect said packet recognizing bit adding circuit and the bus to each other only when sending out the token packet or the data packet to the bus, whereby the token packet having the packet recognizing bit or the data packet having the packet recognizing bit is sent out to the bus.

26. A communication network as claimed in claim 24, wherein each of said plurality of stations comprises:

a packet recognizing bit identifying circuit for identifying the packet recognizing bit added to the token packet or the data packet inputted from an upstream side of the bus, and then recovering receiving timing in the token packet or the data packet;

a packet disassembling circuit for receiving the token packet or the data packet inputted from the upstream side of the bus according to the receiving timing recovered by said packet recognizing bit identifying circuit;

a switch portion for disconnecting the downstream side of the bus from the upstream side of the bus, or connecting the downstream side of the bus to the upstream side of the bus; and a reception control circuit for controlling said packet recognizing bit identifying circuit, said packet disassembling circuit, and said switch portion, wherein said reception control circuit controls said switch portion to connect the downstream side of the bus to the upstream side of the bus to pass the token packets or the data packets from the upstream side of the bus to the downstream side of the bus except when transmitting the token packet or the data packet from the station.

27. A communication network as claimed in claim 21, wherein:

said master station comprises:

a token transfer portion for generating and sending out the token packet on the bus;

an analysis executing portion for analyzing a token packet received through the bus, and sending out a data packet when designated by the ID information in the token packet as being a transmitter of data or sending out the destination status packet and then receiving a data packet when designated by the ID information in the token packet as being a destination of data; and a switch portion of said master station for disconnecting a downstream side of the bus from an upstream side of the bus and then connecting the downstream side of the bus to said token transfer portion and said analysis executing portion, or disconnecting the downstream side of the bus from said token transfer portion and said analysis executing portion and then connecting the downstream side of the bus to the upstream side of the bus; and each of said plurality of slave stations comprises:

an analysis executing portion for analyzing a token packet received through the bus, and sending out a data packet when designated by the ID information in the token packet as being the transmitter of data, or sending out the destination status packet and then receiving a data packet when designated by the ID information in the token packet as being the destination of data; and a switch portion of said slave station for disconnecting a downstream side of the bus from an upstream side of the bus and then connecting the downstream side of the bus to said analysis executing portion, or disconnecting the downstream side of the bus from said analysis executing portion and then connecting the downstream side of the bus to the upstream side of the bus.

28. A communication network as claimed in claim 27, wherein in each of said plurality of stations:

said switch portion disconnects the downstream side of the bus from the upstream side of the bus and then connects the downstream side of the bus to said analysis executing portion;

said analysis executing portion sends out the destination status packet to the bus, and discards the destination status packet after receiving the destination status packet from the bus; and said switch portion disconnects the downstream side of the bus from said analysis executing portion and then connects the downstream side of the bus to the upstream side of the bus after receiving the destination status packet.

29. A communication network as claimed in claim 21, wherein each of said plurality of stations adds a packet recognizing bit to the token packet, the data packet, or the destination status packet, wherein the packet recognizing bit enables receiving timing in the token packet, the data packet, or the destination status packet to be recovered on a destination station side of the token packet, the data packet, or the destination status packet.

30. A communication network as claimed in claim 29, wherein each of said plurality of stations recovers the receiving timing in the token packet, the data packet, or the destination status packet according to the packet recognizing bit in the token packet, the data packet, or the destination status packet.

31. A communication network as claimed in claim 29, wherein each of said plurality of stations comprises:

a transmitted packet assembling circuit for assembling the token packet, the data packet, or the destination status packet;

a packet recognizing bit adding circuit for adding the packet recognizing bit to the token packet, the data packet, or the destination status packet assembled by said transmitted packet assembling circuit;

a switch portion for disconnecting a downstream side of the bus from an upstream side of the bus, and then connecting the downstream side of the bus to said packet recognizing bit adding circuit, or disconnecting the downstream side of the bus from said packet recognizing bit adding circuit, and then connecting the downstream side of the bus to the upstream side of the bus; and a transmission control circuit for controlling said transmitted packet assembling circuit, said packet recognizing bit adding circuit, and said switch portion;

said transmission control circuit controls said switch portion to connect said packet recognizing bit adding circuit and the bus to each other only when sending out the token packet, the data packet, or the destination status packet to the bus, whereby the token packet, the data packet, or the destination status packet to which the packet recognizing bit is added is sent out to the bus.

32. A communication network as claimed in claim 30, wherein each of said plurality of stations comprises:

a packet recognizing bit identifying circuit for identifying the packet recognizing bit added to the token packet, the data packet, or the destination status packet inputted from an upstream side of the bus, and then recovering receiving timing in the token packet, the data packet, or the destination status packet;

a packet disassembling circuit for receiving the token packet, the data packet, or the destination status packet inputted from the upstream side of the bus according to the receiving timing recovered by said packet recognizing bit identifying circuit;

a switch portion for disconnecting a downstream side of the bus from the upstream side of the bus, or connecting the downstream side of the bus to the upstream side of the bus; and a reception control circuit for controlling said packet recognizing bit identifying circuit, said packet disassembling circuit, and said switch portion, wherein said reception control circuit controls said switch portion to connect the downstream side of the bus to the upstream side of the bus except when transmitting the token packet, the data packet, or the destination status packet from the station, to pass the token packet, the data packet, or the destination status packet from the upstream side of the bus to the downstream side of the bus at the station.

33. A method of communication between a master station and a plurality of slave stations connected to communicate with each other via a bus, the master station and the plurality of slave stations being respectively provided with ID information for identification, said method comprising:

sending out a token packet from the master station onto the bus, the token packet comprising ID information identifying at least one of the plurality of slave stations and the master station that is to transmit a data packet as being a transmitter and comprising ID information identifying at least one the plurality of slave stations and the master station that is to receive the data packet as being a destination;

receiving, at the master station and the plurality of slave stations, the token packet sent and transmitted through the bus without being changed by any of the plurality of slave stations;

analyzing the ID information contained in the received token packet at each of the master station and the plurality of slave stations;

sending out the data packet from the at least one of the plurality of slave station and the master station being designated as the transmitter; and receiving the data packet sent through the bus at the at least one of the plurality of slave stations and the master station that is designated as the destination;

wherein the data packet sent out by the transmitter is not provided with the ID information identifying the at least one of said plurality of slave station as being the transmitter of data and the at least one of said plurality of slave stations as being the destination of the data.

* * * * *